United States Patent
Ueda et al.

[11] Patent Number: 5,237,237
[45] Date of Patent: Aug. 17, 1993

[54] ULTRASONIC MOTOR AND DRIVE METHOD

[75] Inventors: Tomoo Ueda; Osamu Miyazawa; Joji Kitahara; Tsuneaki Furukawa, all of Suwa, Japan

[73] Assignee: Seiko Epson Corporation, Tokyo, Japan

[21] Appl. No.: 667,691

[22] Filed: Mar. 11, 1991

[30] Foreign Application Priority Data

| Mar. 12, 1990 | [JP] | Japan | 2-60292 |
| Mar. 13, 1990 | [JP] | Japan | 2-61671 |
| Mar. 20, 1990 | [JP] | Japan | 2-70324 |
| Mar. 27, 1990 | [JP] | Japan | 2-31685[U] |
| Apr. 18, 1990 | [JP] | Japan | 2-102573 |
| Jul. 9, 1990 | [JP] | Japan | 2-181219 |
| Jan. 17, 1991 | [JP] | Japan | 3-3921 |
| Jan. 17, 1991 | [JP] | Japan | 3-3922 |
| Jan. 17, 1991 | [JP] | Japan | 3-3923 |

[51] Int. Cl.$^5$ .................................. H01L 41/08
[52] U.S. Cl. .................................. 310/323; 310/317
[58] Field of Search .................. 310/316, 317, 323

[56] References Cited

U.S. PATENT DOCUMENTS

| 4,510,411 | 4/1985 | Hakamata et al. | 310/316 |
| 4,513,219 | 4/1985 | Katsuma et al. | 310/317 |
| 4,562,374 | 12/1985 | Sashida | 310/328 |
| 4,831,305 | 5/1989 | Mukohjima et al. | 310/323 |
| 4,882,500 | 11/1989 | Iijima | 310/323 |
| 5,006,746 | 4/1991 | Kasuga et al. | 310/323 |
| 5,013,956 | 5/1991 | Kurozumi et al. | 310/323 |
| 5,079,470 | 1/1992 | Kasuga et al. | 310/323 |
| 5,099,166 | 3/1992 | Hirano et al. | 310/323 |

FOREIGN PATENT DOCUMENTS 0293977 12/1987 Japan .................................. 310/323

OTHER PUBLICATIONS

R. Inaba, et al., "Piezoelectric Ultrasonic Motor", IEEE 1987 Ultrasonics Symposium, Proceedings, vol. 2, Oct. 14–16, 1987 Denver Colorado, pp. 747–756.

Primary Examiner—Mark O. Budd
Assistant Examiner—Thomas M. Dougherty
Attorney, Agent, or Firm—W. Douglas Carothers, Jr.; Raymond J. Werner

[57] ABSTRACT

An ultrasonic motor comprising a rotor and a stator driven by a piezoelectric element is disclosed. The rotor includes a plurality of gaps which correspond to periods in which piezoelectric sub-element rows are formed. A plurality of level differences on the surface of the stator have rotational symmetry in prescribed periods. Standing waves generated on the stator exert stress on the level differences of non-contact areas of the rotor so as to provide for rotor rest at a relative position where the stress becomes balanced. Stepping operation of the rotor is achieved by movement of the standing waves employing a plurality of level differences with rotational symmetry. The positions where the stress becomes balanced always occur at the same interval thereby facilitating precise stepping operation.

21 Claims, 29 Drawing Sheets

ULTRASONIC MOTOR AND DRIVE METHOD

BACKGROUND OF THE INVENTION

This invention relates generally to ultrasonic motors which convert vibration energy of a piezoelectric element into rotational movement and, particularly, to the mechanical structure of ultrasonic motors suited to stepping operation for use in clocks, watches and their drive methods.

Ultrasonic motors of the prior art generate a progressive or standing wave on an annular or disc-shaped stator by applying a drive voltage on the piezoelectric element and using frictional force to rotate the rotor in contact with teeth formed on the stator. Each of the sub-elements, in which the direction of polarization (poling) is opposite from top to bottom on the element, are alternated and arranged parallel to each other on the piezoelectric element. By shifting the phase of these parallel periods at two locations on the element, two piezoelectric sub-element rows are formed. When an AC voltage is applied on the top and bottom of these piezoelectric sub-element rows, the sub-element rows polarized in the opposite direction are alternately expanded and contracted in the circumferential direction of the piezoelectric element causing overall deformation in the wave shape and generating a progressive wave on the surface of the stator fixed to the piezoelectric element. This progressive wave sequentially changes the height of the teeth formed on the stator and the frictional force between the teeth and the rotor in contact with the teeth cause the rotor to rotate in a prescribed direction.

Such prior art ultrasonic motors present heretofore unresolved problems. When precise positioning control of the rotor is performed such as in stepping operations and in resting at a prescribed rotational position, it is necessary in such devices to attach an encoder or other type of feedback sensor to perform feedback control. Attachment of a position sensor, however, makes difficult construction of the mechanical portion of the assembly compact and such control systems consume significant amounts of power, therefore such devices are particularly unsuited as an ultrasonic motor for clocks and watches requiring a compact, low-power configuration.

This invention is intended to solve these and other problems by providing a compact, low-power ultrasonic motor capable of stepping operation without employing a position sensor and feedback control circuit by using special structures for the rotor and the stator and generating standing waves on the stator.

SUMMARY OF THE INVENTION

An exemplary ultrasonic motor of the present invention comprises a piezoelectric element on one side, a piezoelectric element stator, a rotor in contact with the stator and rotated by frictional force, a piezoelectric element provided on the piezoelectric element and on which piezoelectric sub-elements polarized in opposite directions from top to bottom are alternately positioned, a first piezoelectric sub-element row and a second piezoelectric sub-element row formed along the annular piezoelectric element with a period that is one integral part of the circumference and with a mutual spatial phase difference, and a drive means capable of applying AC voltages on the first piezoelectric sub-element row and the second piezoelectric sub-element row, wherein non-contact areas made up of notches or indentations and corresponding to the stator are formed on the rotor on the surface toward the stator in the direction of rotation and in intervals that are half the prescribed period of the first piezoelectric sub-element row and the second piezoelectric sub-element row.

A plurality of level differences having rotational symmetry are formed on the stator on the circumference opposite the non-contact areas on the surface toward the rotor with a period that is one part of 2n parts (where n is a natural number of 3 or greater) of the prescribed period of the first piezoelectric sub-element row and the second piezoelectric sub-element row.

Here, the first piezoelectric sub-element row and the second piezoelectric sub-element row may be positioned along the piezoelectric element with a spatial phase difference that is one-fourth the prescribed phase, or the first piezoelectric sub-element row and the second piezoelectric sub-element row may be positioned along the piezoelectric element with a spatial phase difference that is one-sixth the prescribed phase.

The first piezoelectric sub-element row and the second piezoelectric sub-element row are formed so that the positioning and direction of polarization of their respective piezoelectric sub-elements are linearly symmetrical to each other on the surface of the piezoelectric element.

Further, the piezoelectric element is equipped with a first electrode with conductive contact on one side of the first piezoelectric sub-element row, a second electrode with conductive contact on one side of the second piezoelectric sub-element row and a common electrode with conductive contact on opposite sides of the first and second piezoelectric sub-element rows. The drive means is equipped with a first output switch for outputting drive signals to the first electrode, a second output switch for outputting drive signals to the second electrode and a third output switch for outputting drive signals to the common electrode. The output switches can be set to a high impedance output condition in addition to the drive signal output condition.

In such ultrasonic motors, the drive means intermittently rotates the rotor by repeating a first drive condition in which AC voltages with a prescribed mutual phase difference are applied between the first electrode and the common electrode and between the second electrode and the common electrode to induce a progressive wave on the piezoelectric element and a second or third drive condition in which an AC voltage is applied between the first electrode or the second electrode and the common electrode to induce a standing wave on the piezoelectric element. Here, the first drive condition, the second drive condition and a stop condition in which an AC voltage is not applied between the first electrode or the second electrode and the common electrode may be sequentially repeated.

In an alternative drive method, a first drive condition in which an AC voltage is applied between a first electrode and a common electrode to induce a first standing wave on the piezoelectric element, a second drive condition in which an AC voltage is applied between the second electrode and the common electrode to induce a second standing wave on the piezoelectric element with the prescribed phase difference, and a third drive condition in which an AC voltage is applied between the first electrode and the common electrode and between the second electrode and the common electrode to induce a composite standing wave on the piezoelectric element are repeated in any sequence to rotate the rotor.

In still another drive method, a first drive condition in which an AC voltage is applied between the first electrode and the common electrode to induce a first standing wave on the piezoelectric element, a second drive condition in which an AC voltage is applied between the second electrode and the common electrode to induce a second standing wave on the piezoelectric element, a third drive condition in which an AC voltage is applied between the first electrode and the common electrode and between the second electrode and the common electrode to induce a third standing wave on the piezoelectric element, and a fourth drive condition in which an AC voltage is applied between the first electrode and the second electrode with the output switch connected to the common electrode in a cutoff (high output impedance) condition to induce a fourth standing wave on the piezoelectric element are repeated in any sequence.

By means of the invention, when an AC voltage is applied by the drive means to the first piezoelectric sub-element row of the piezoelectric element, each of the sub-elements of the piezoelectric sub-element row alternately expand and contract, and a wave with the same period as the prescribed period formed by the piezoelectric sub-elements is generated on the stator along the annulus of the piezoelectric element. The first piezoelectric sub-element row is formed with a period that is one integral part of the circumference of the piezoelectric element and, when an AC voltage is applied, the piezoelectric element is deformed into the shape of a standing wave, and the wave formed on the stator becomes the first standing wave. Similarly, when an AC voltage is applied on the second piezoelectric sub-element row, a second standing wave is formed on the piezoelectric element along the prescribed period of the second piezoelectric sub-element row. Since the first piezoelectric sub-element row and the second piezoelectric sub-element row are positioned so their periods have a phase difference, the second standing wave is shifted from the first standing wave by that phase difference. Further, by applying an AC voltage on both the first piezolectric sub-element row and the second piezoelectric sub-element row, a composite standing wave of the first and the second standing waves can be formed on the piezoelectric element. Since this composite standing wave is formed from the first standing wave and the second standing wave which are generated with a spatial phase difference between them, it becomes a standing wave with a phase different from the phases of both the first and second standing waves. When an AC voltage is applied with a phase mutually different from the first piezoelectric sub-element row and the second piezoelectric sub-element row, then the composite wave becomes a progressive wave.

The standing waves generated on the stator come in contact with level differences in non-contact areas of the rotor and exert a stress from the antinodes of the standing wave toward the nodes. The location where this stress becomes balanced determines the resting position of the rotor. The level differences in the non-contact areas of the rotor receive stress from the antinodes toward the nodes of the standing waves by contact of the level differences in the stator due to the standing wave with the boundary of the non-contact areas of the rotor, and they rest on the nodes of the standing waves where the stress becomes balanced before or after in the direction of rotation. The progressive wave generated in the stator exerts a flow stress on the contact areas of the rotor, and the couple generated by this rotates the rotor in the reverse direction of progression.

In the case in which multiple level differences are formed on the stator, level differences formed when a standing wave is generated on the stator vibrate up and down along the standing wave. Since these level differences are formed with rotational symmetry in a period that is one of n parts (where n is a natural number of 3 or greater) of one-half the prescribed period, the same balanced-stress condition can be maintained on the standing wave when the rotor is stepped with the period of the level differences, thus making it possible to precisely and continually maintain a constant angle of rotation.

The first and the second piezoelectric sub-element rows are formed linearly symmetrical to each other on the surface of the piezoelectric sub-element. The vibration states of the first and second standing waves, i.e., the amplitudes of the waves and the times required until the waves stabilize can be equalized.

A progressive wave is formed on the piezoelectric element by applying an AC voltage having a phase difference with both the first piezoelectric sub-element row and the second piezoelectric sub-element row formed with a mutual phase difference. When a progressive wave forms on the stator as a result, the contact portions of the rotor is stressed by this progressive wave and rotated in the reverse direction. After the rotor is rotated for the prescribed time period by this progressive wave, the first or second standing wave is generated on the stator. By resting the rotor on the nodes, stepped operation of the rotor is achieved. When the rotor is intermittently driven at the prescribed stepping angle, power consumption during drive can be reduced by adding a stop period during which the drive signal is not applied after the rotation period and the rest period.

When the first, second and composite standing waves are formed by mutually shifting the first and second piezoelectric sub-element rows one-sixth of a period, the position of the nodes of the standing wave can be successively moved one-sixth of a period by sequentially forming these waves on the stator. Since the non-contact areas of the rotor also move the prescribed angle and then rest, stepping operation of the rotor is obtained.

The ultrasonic motor drive means is provided with first, second and third output switches which supply drive signals between the first and second electrodes of the piezoelectric element and their common electrode. Assuming these output switches can be set to a cut-off (high output impedance) condition, the first standing wave can be generated on the piezoelectric element by applying AC voltages from the first and third output switch between the first electrode and the common electrode. The second standing wave can be generated by applying AC voltages from the second and third output switch between the second and common electrode. The third standing wave can be generated by applying AC voltages from the first, second and third output switch between the first, second and common electrode. The fourth standing wave can be generated by applying AC voltages from the first and second output switch between the first and second electrode and setting the third output switch to a high impedance condition.

Applying AC voltage between the first and second electrodes and arranging the common electrodes to an open condition, this fourth standing wave becomes the same condition when AC voltage is applied between the first piezoelectric sub-element row and the common electrode and also between the second piezoelectric sub-element row and the common electrode, these AC voltage being shifted 180° from each other. Where the first standing wave A and the second standing wave B have identical phase, the composite of waves A and B is A+B and the fourth standing wave is A+B̄ or Ā+B. When the periods of the first and second piezoelectric sub-element rows are shifted one-fourth of a period, four standing waves shifted one-eighth of a period are generated on the piezoelectric element and the rotor can be successively rotated by these four standing waves.

Other objects and attainments together with a fuller understanding of the invention will become apparent and appreciated by referring to the following description and claims taken in conjunction with the accompanying drawings.

DESCRIPTION OF THE INVENTION

Figure 1:
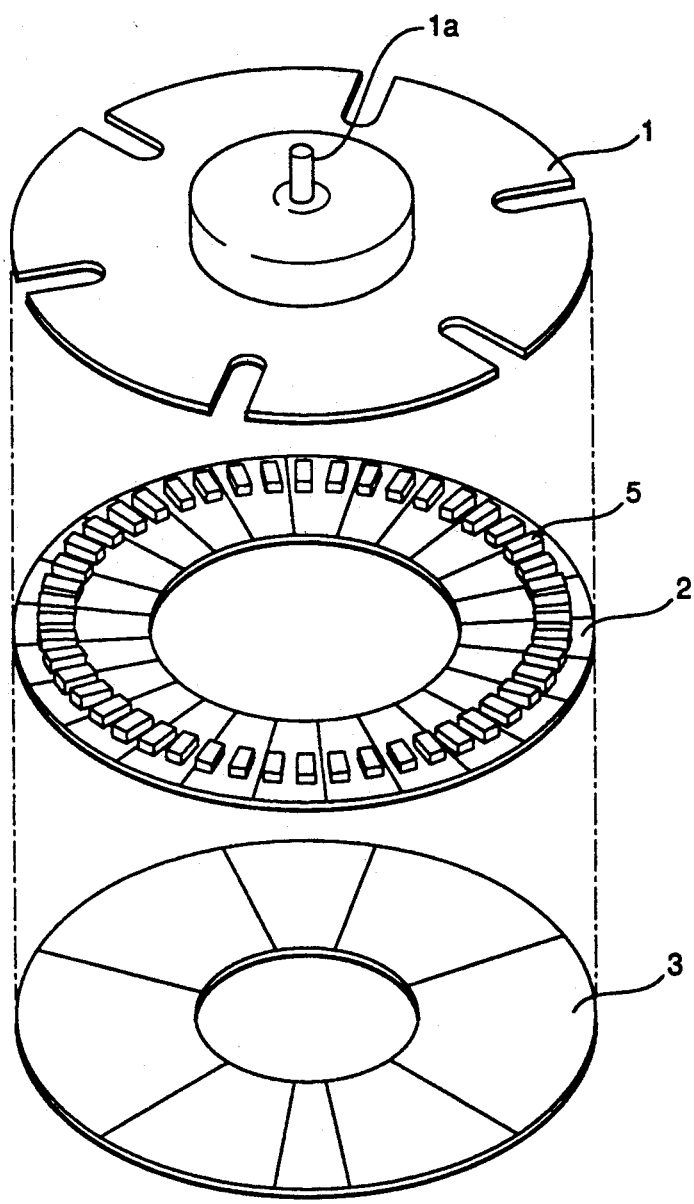
FIG. 1 is an isometric view of the components of an exemplary embodiment of an ultrasonic motor according to the present invention.
Figure 2:
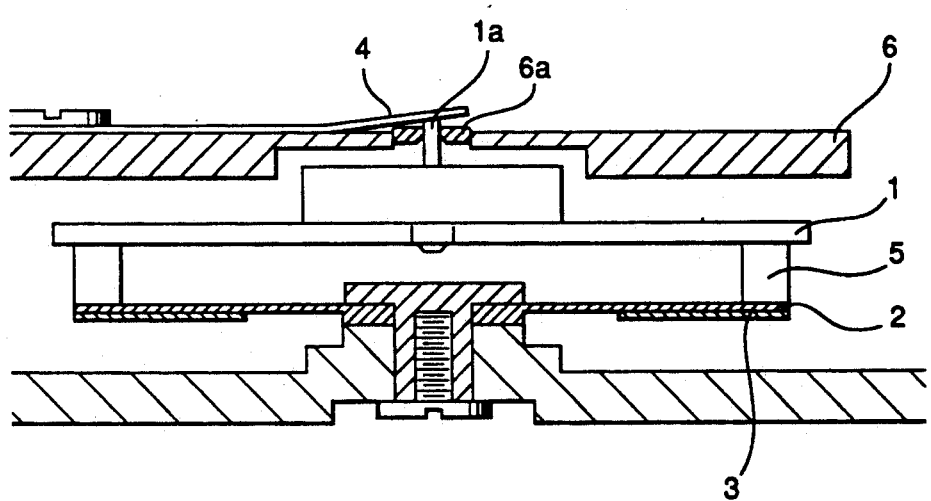
FIG. 2 is a cross section of the assembled components of the embodiment of FIG. 1.
Figure 3A:
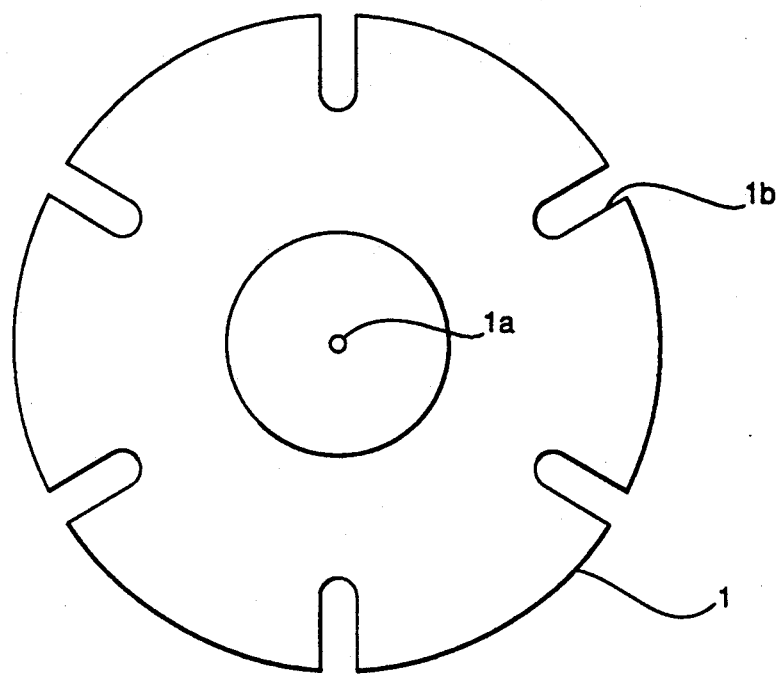
FIGS. 3(a) and (b) are top and side views, respectively, of the structure of the rotor of the embodiment of FIG. 1.
Figure 3B:
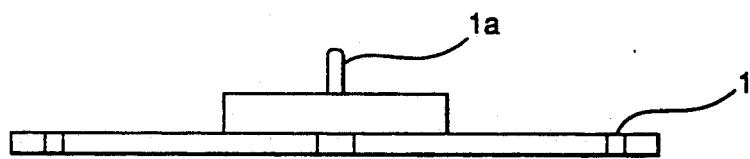

Referring to the drawings, FIGS. 1 and 2 show rotor 1, stator 2 and piezoelectric element 3 which comprise the principal parts of the ultrasonic motor. Rotor 1 is in contact with the tops of a plurality of teeth 5 arranged in a circle on stator 2. Axle 1a is supported by plate 6 via bearing 6a so as to slide freely in the axial direction. The bottom surface of rotor 1 is pressed against the top of stator 2 by spring 4 fixed to support plate 6. Referring to FIGS. 3(a) and (b), rotor 1 is disc shaped with center axle 1a. Notches 1b of a prescribed depth are formed along the outer circumference in six locations with equal intervals and correspond numerically to the antinodes of standing waves generated on stator 2.

Figure 4A:
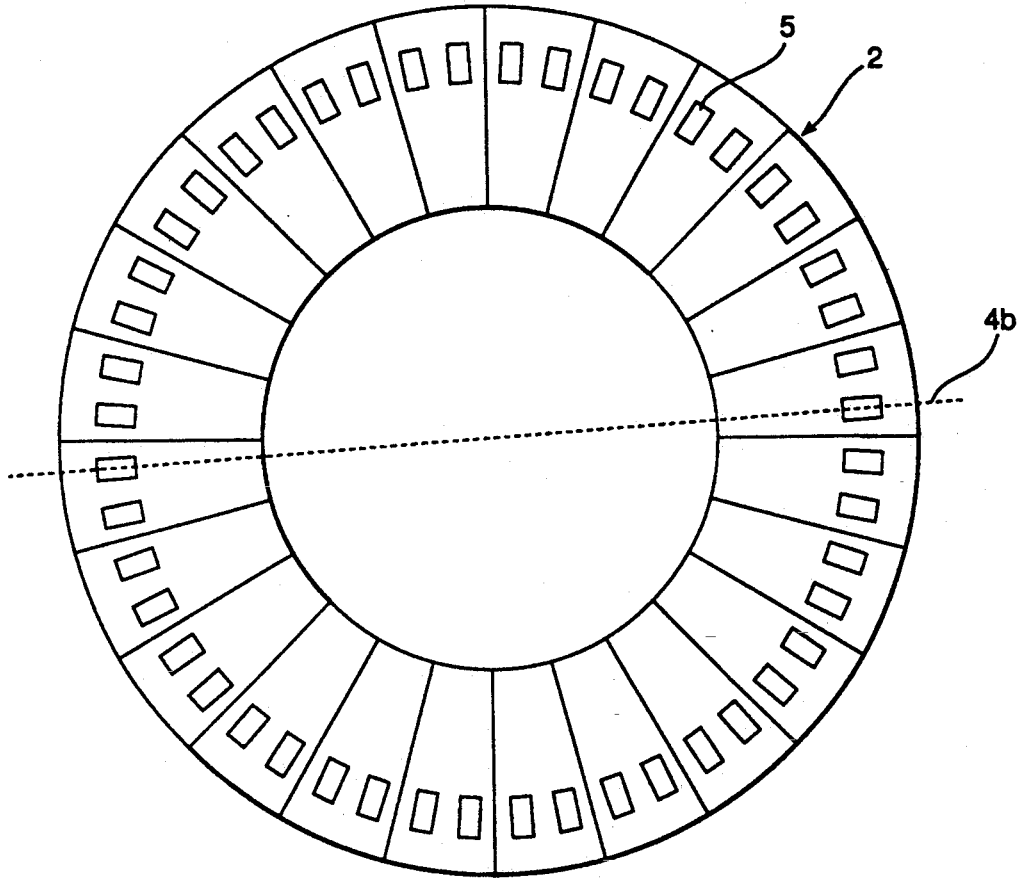
FIGS. 4(a) and (b) are a top view and cross section, respectively, of the stator of the embodiment of FIG. 1.
Figure 4B:
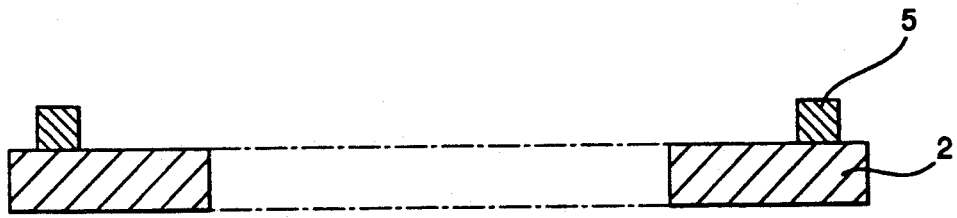

As illustrated in FIG. 4, forty-eight teeth 5 are positioned radially in equal intervals in a circle on the surface of stator 2. The number of teeth 5 formed is determined as shown in the table below according to the number of standing waves generated on stator 2 and the stepping angle (angle of rotation) required by rotor 1.

TABLE 1

| Wave Number | Stepping angle | Number of teeth (n is natural number) |
|---|---|---|
| 3λ | 15.00 degrees | 24 × n |
| 4λ | 11.25 degrees | 32 × n |
| 5λ | 9.00 degrees | 40 × n |

The number of waves indicates the number of wave lengths of the standing wave formed on stator 2 by piezoelectric element 3. The stepping angle is the minimum angle of rotation required by rotor 1. The number of teeth represents the number of teeth formed on stator 2.

Figure 17:
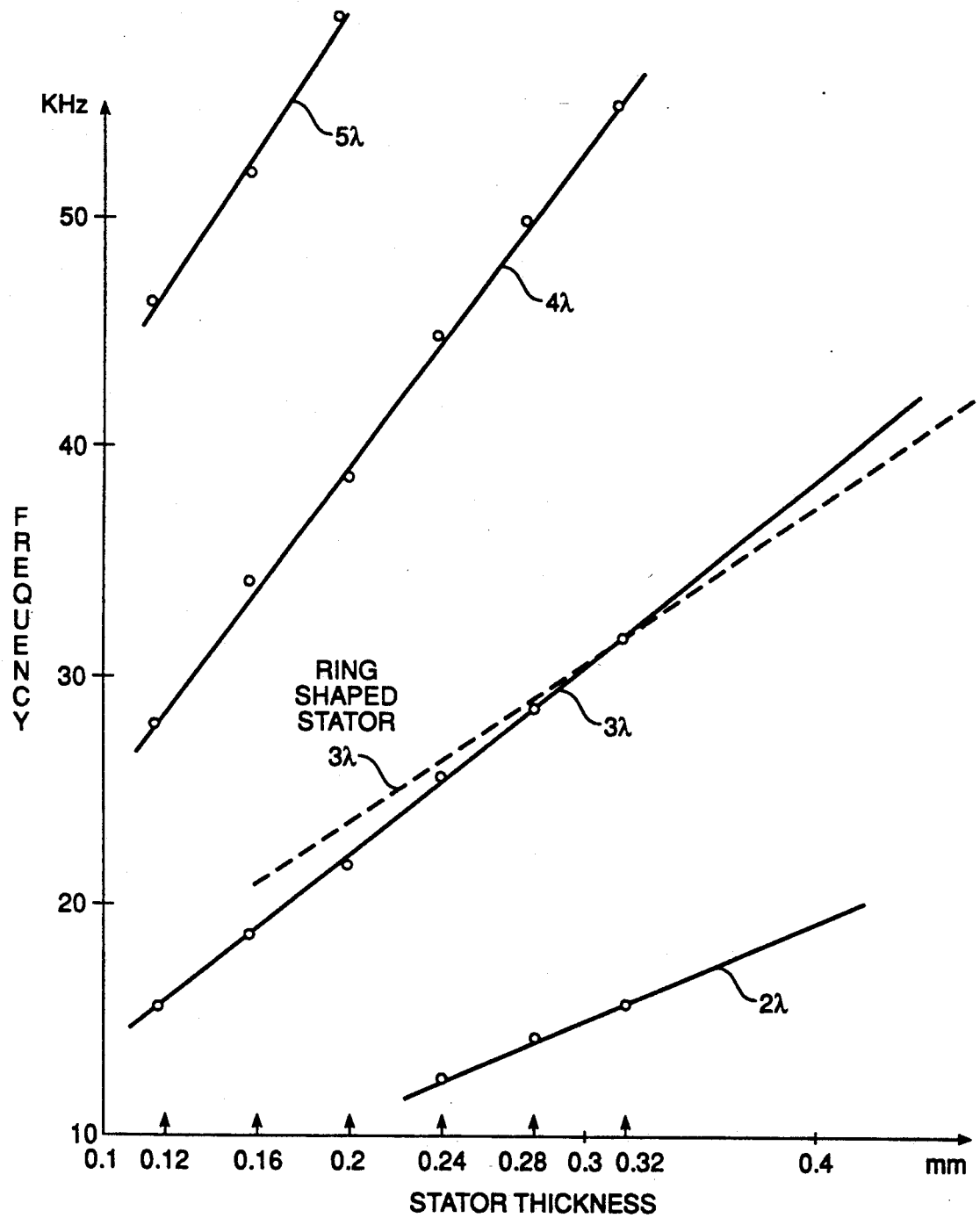
FIG. 17 is a graph depicting the relationship between stator thickness and resonance frequency at each of the wavelengths of the standing waves formed on the stator.

The resonance frequency of the standing wave varies according to the thickness and shape of the stator. FIG. 17 depicts the relationship between thickness and resonance frequency in a disc-shaped stator at selected wavelengths of 2λ to 5λ formed on the stator. The resonance frequency when a three-wavelength standing wave is formed (3λ) on a ring-shaped stator is indicated by the broken line. In the case of the stator employed in the present embodiment, resonance frequencies like those shown below are obtained:

3λ: 32 kHz
2λ: 17 kHz
4λ: 50 kHz.

In the present embodiment, a standing wave with a resonance frequency of about 32 kHz is employed to form a standing wave of three wavelengths on the piezoelectric element. In this embodiment, teeth of the same shape are formed in equal intervals around the entire circumference in numbers according to TABLE 1. In the case of three wavelengths and a stepping angle of 15 degrees, for example, 24 groups of teeth may be formed with a plurality of different shapes and still satisfy the configuration requirements of the invention as long as the stator has a surface shape which demonstrates an overall rotational symmetry over 24 rotations. Indentations or other types of level differences may be formed in the surface of stator 2 instead of teeth.

Figure 5A:
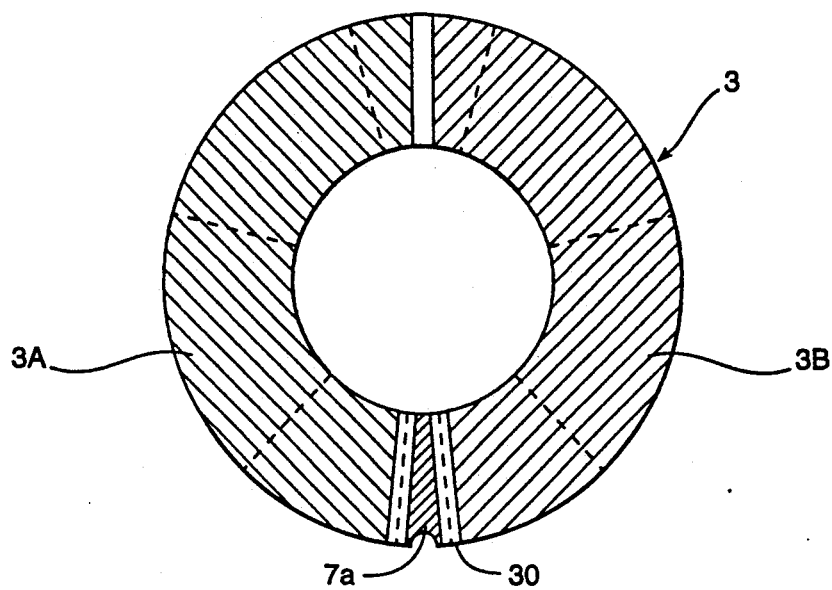
FIGS. 5(a), (b) and (c) are top, bottom and side views, respectively, depicting the piezoelectric element of the embodiment of FIG. 1.

Next, piezoelectric element 3 is fixed to the bottom of stator 2. As shown in FIGS. 5(a), (b) and (c), piezoelectric element 3 comprises piezoelectric element 30 and electrodes formed from silver paste. The A phase comprising piezoelectric sub-elements $30_{a1}$, $30_{a2}$ and $30_{a3}$ and the B phase comprising piezoelectric sub-elements $30_{b1}$, $30_{b2}$ and $30_{b3}$ are formed radially on the annular piezoelectric element 3. Piezoelectric sub-elements $30_{a1}$, $30_{a2}$, $30_{a3}$, $30_{b1}$, $30_{b2}$ and $30_{b3}$ are polarized (poling) sequentially in alternating and opposing directions. The directions of polarization are indicated by + and − in FIG. 5(b). A phase electrode 3A and B phase electrode 3B, shown in FIG. 5(a), are formed on the top surface of the piezoelectric element and pilot electrode 7a is formed on the surface of piezoelectric sub-element 31. Pilot electrode 7a is employed to detect the strength of the wave generated on piezoelectric element 30. By feeding the detected value back to the drive circuit, the frequency of the drive signal can be adjusted to conform to the resonance frequency of stator 2 to drive the ultrasonic motor with high efficiency. As seen in FIGS. 6(a) and (b), there are cases in which two pilot electrodes $7_{a1}$ and $7_{a2}$ are employed to separately adjust the frequency of the drive signal for the standing waves based on the A phase and B phase and, particularly, when the A phase and B phase resonance frequencies of stator 2 differ due to structural fluctuations, the motor drive efficiency can be further improved by setting separate drive frequencies for the A phase and the B phase. Here, piezoelectric sub-elements $30_{a1}$ and $30_{a2}$ occupy areas separated by 60 degrees on annular piezoelectric element 30. When a voltage is applied on the A phase comprising piezoelectric sub-elements $30_{a1}$, $30_{a2}$ and $30_{a3}$, a three-wavelength standing wave is formed on the piezoelectric element. Similarly, piezoelectric sub-elements $30_{b1}$ and $30_{b2}$ are set apart at 60 degrees. When voltage is supplied to the B phase, a three-wavelength standing wave is formed on piezoelectric element 30. Piezoelectric sub-elements $30_{a3}$ and $30_{b3}$ are set at 37.5 degrees, piezoelectric sub-element 31 is set at 15 degrees and piezoelectric sub-element 30c is set at 30 degrees. As a result, the A phase and B phase are formed on piezoelectric element 30 so their periods are mutually shifted 30 degrees, i.e. one-fourth of a period.

Figure 5B:
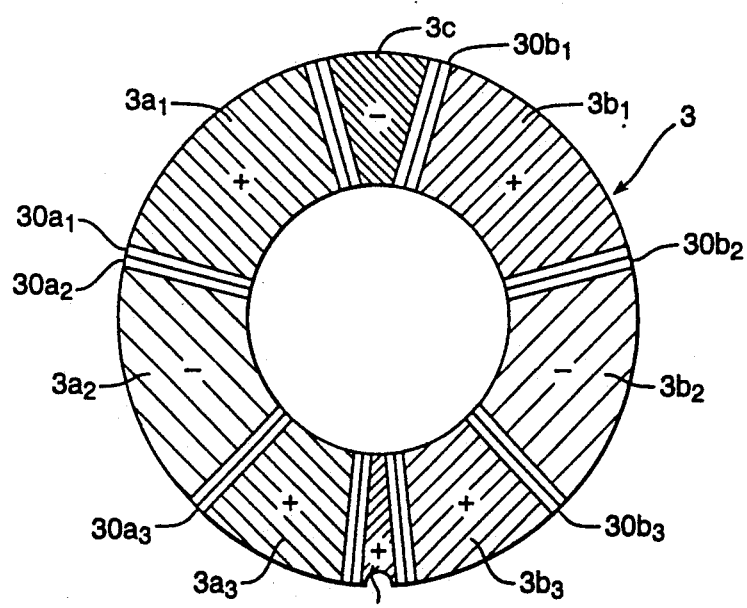
Figure 5C:
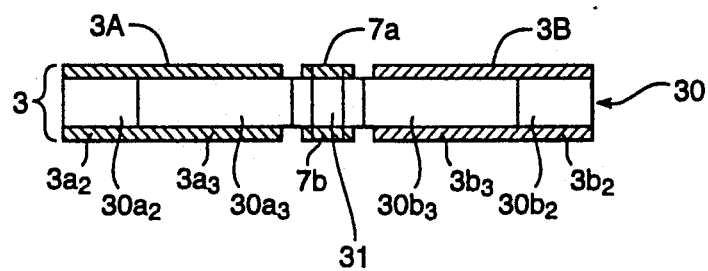
Figure 6A:
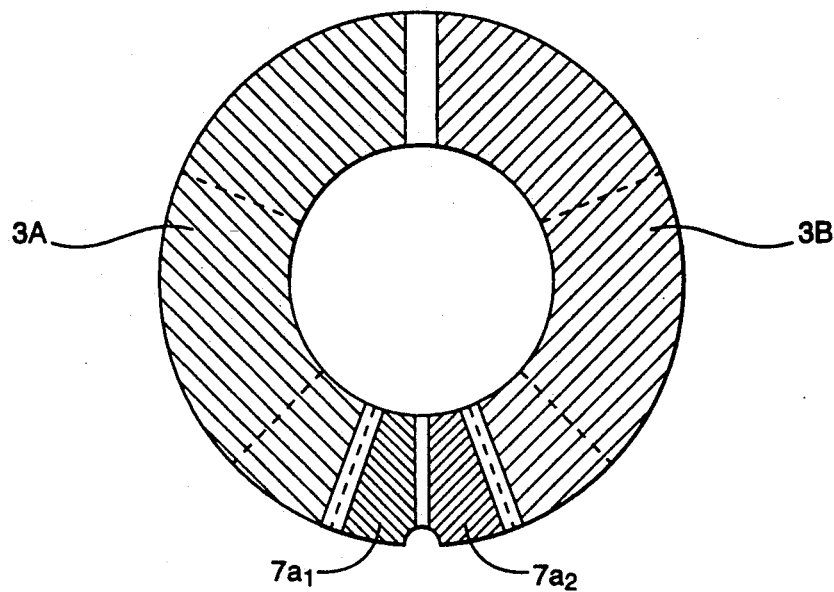
FIGS. 6(a) and (b) are top and bottom views, respectively, depicting the structure of a piezoelectric element provided with two pilot electrodes.
Figure 6B:
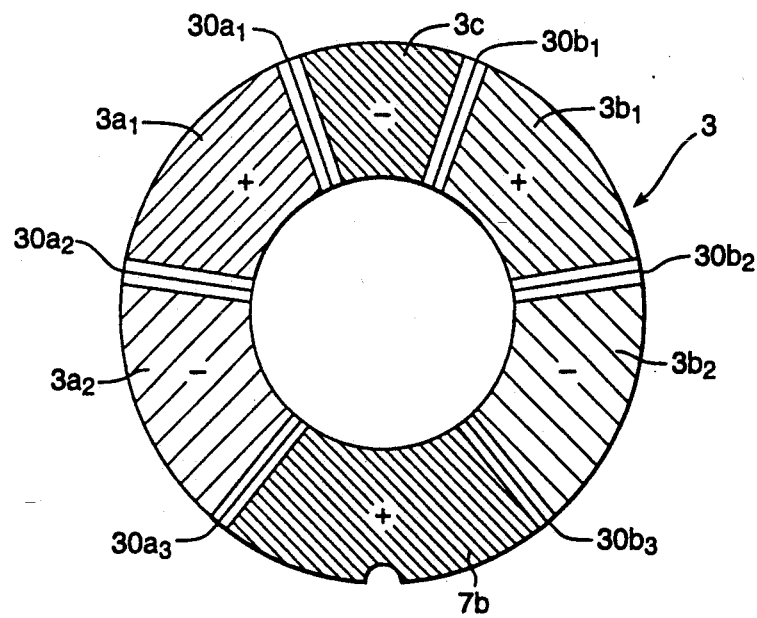

As shown in FIG. 5(b), the sub-element electrodes $3_{a1}$, $3_{a2}$, $3_{a3}$, $3_c$, $3_{b1}$, $3_{b2}$, $3_{b3}$ and $7_b$ form the sub-elements on the lower surface of piezoelectric element 3. By bringing the lower surface shown in FIG. 5(b) in conductive contact with the bottom surface of stator 2, stator 2 becomes the common electrode for piezoelectric element 3.

Figure 7:
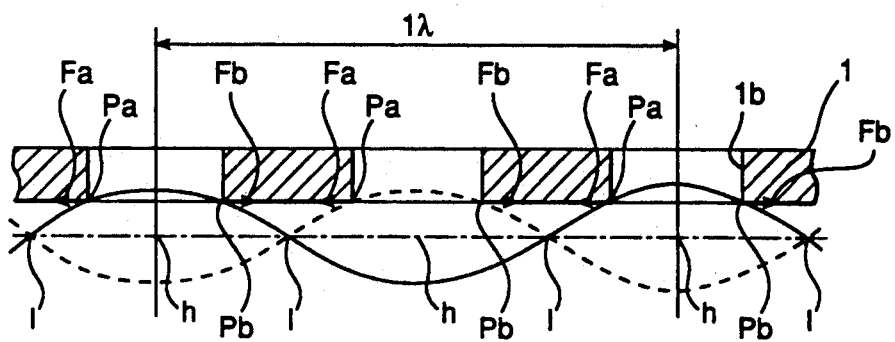
FIG. 7 is a working diagram depicting the positional relationship of the rotor notches and standing waves.

As shown in FIG. 7, rotor 1 contacts the top of the standing wave generated on stator 2 to which piezoelectric element 3 is attached. When the sums of stresses $F_a$ and $F_b$ exerted on the bottom edges $P_a$ and $P_b$ of the side walls of notches 1b by stator 2 are unequal, rotor 1 receives the couple due to the stress difference and is rotated. When notches 1b or rotor 1 move directly over the position of antinodes n of the standing wave, right and left stresses $F_a$ and $F_b$ become balanced, and rotor 1 rests over this balanced position as long as the standing wave remains stabilized. The angle of rotation of rotor 1 can be accurately positioned by generating a standing wave on stator 2. Especially high reliability can be achieved when using the ultrasonic motor as a drive motor for clocks and watches. Further, in this embodiment, teeth with the prescribed periodic rotational symmetry are provided on stator 2. When rotor 1 is precisely stepped with this period, the correlation between the shape of the non-contact areas of rotor 1 and the surface shape of stator 2 remains constant. Conversely, since the position where the stress between the non-contact areas of rotor 1 and the teeth on stator 2 become balanced remains constant with respect to the phase of the standing wave and the interval of the stepping operation remains constant, the accuracy of the stepping angle is further improved. In piezoelectric element 30, the A and B phase are formed so that they are linearly symmetrical with respect to both their periods and the polarity of the sub-elements. As a result, it becomes easier to make the output characteristics the same for the drive signals of the A and B phases, and the vibration strength at the resonance frequency of stator 2 and the prescribed drive frequency can be made the same, thus improving the drive efficiency of the ultrasonic motor.

Figure 8:
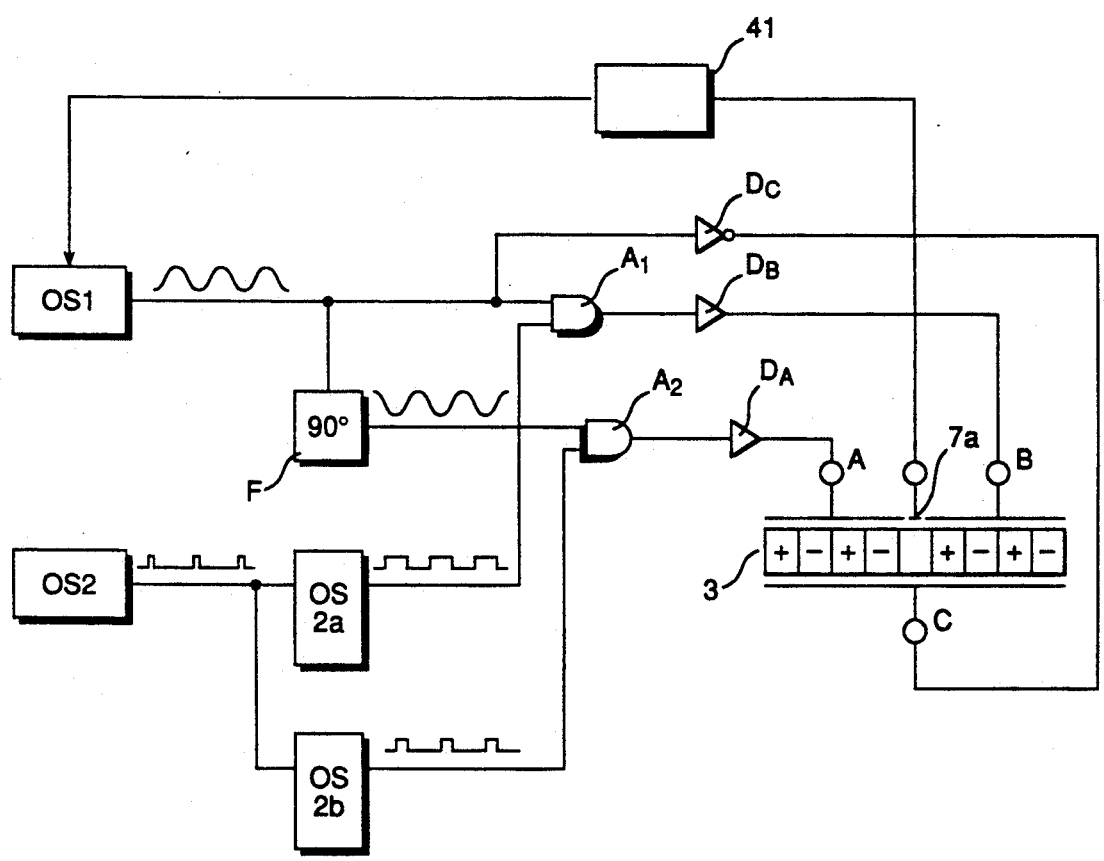
FIG. 8 is a schematic depicting the drive circuit of the embodiment of FIG. 1.

Next, is an explanation of an example, shown in FIG. 8, of the drive circuit which supplies the drive signals for the piezoelectric element 3 of FIG. 5(a). The drive signals for piezoelectric element 3 are supplied by terminal A connected to A phase electrode 3A, terminal B connected to B phase electrode 3B, and common electrode C connected to stator 2 connected to the sub-element electrodes $3_{a1}$, $3_{a2}$, $3_{a3}$, $3_c$, $3_{b1}$, $3_{b2}$, $3_{b3}$ and $7_b$. Pilot electrode $7_a$ detects the strength of the wave generated on piezoelectric element 30.

A control signal of a prescribed frequency is supplied to AND gate $A_1$ from oscillation circuit $OS_1$ and a control signal whose phase is delayed 90 degrees is supplied to AND gate $A_2$ from phase modulation circuit F. Oscillation circuit $OS_2$, however, supplies the reference pulse for the one-shot circuits $OS_{2a}$ and $OS_{2b}$. These supply the gate signal to AND gates $A_1$ and $A_2$. While this gate signal is being supplied, AND gate $A_2$ outputs a control signal to driver $D_A$, a drive signal in synchronization with the control signal is sent to terminal A, AND gate $A_1$ outputs a control signal to driver $D_B$, and a drive signal is sent to terminal B in the same manner. During this period a control signal is supplied from constant oscillation circuit $OS_1$ to driver $D_C$ and an inverted signal with respect to the drive signal supplied to terminals A and B is supplied to terminal C.

Figure 9A:
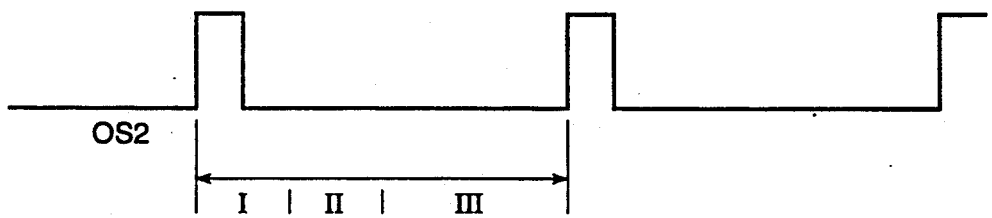
FIGS. 9(a) to (c) are timing charts depicting operation of the drive circuit of FIG. 8.
Figure 9B:
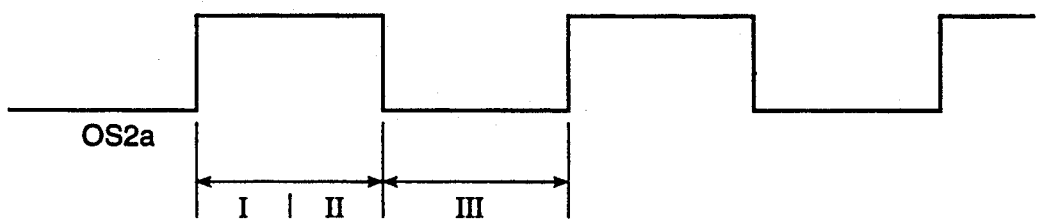
Figure 9C:
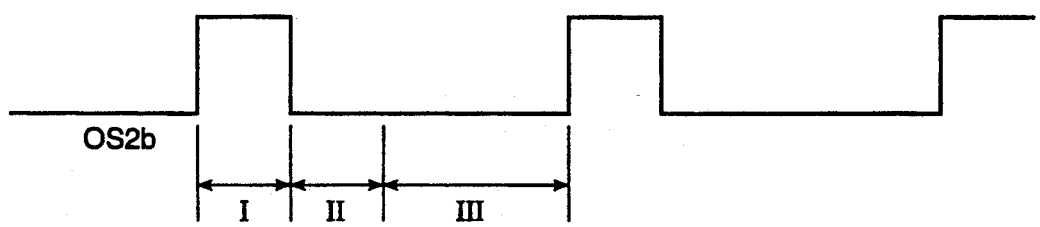

The operation of the drive circuit is explained with reference to the timing charts of FIGS. 9(a)-(c). FIG. 9(a) depicts the reference pulse of oscillation circuit $OS_2$, and one-shot circuits $OS_{2a}$ and $OS_{2b}$, to which the reference pulse is input, supply the gate signals shown in FIG. 9(b) and (c) to AND gates $A_1$ and $A_2$, respectively. As a result, both AND gates $A_1$ and $A_2$ open during period I and drive signals with a mutual phase difference of 90 degrees are applied on the A phase and B phase of piezoelectric element 3. The waves generated by the piezoelectric sub-element rows of the A and B phases formed with a mutual spatial shift of one-fourth of a period are combined to form a progressive wave on piezoelectric element 30. During period II, AND gate $A_2$ is cut off and the drive signal from driver $D_A$ is not supplied to terminal A, and so the drive signal is supplied to only the B phase of piezoelectric element 30 and a standing wave determined by the period of the B phase is generated on piezoelectric element 30. In period III, both AND gates $A_1$ and $A_2$ are cut off and no drive signal is supplied to either terminal A or B, therefore no voltage is applied on piezoelectric element 30 and no wave of any kind is generated.

By means of this drive circuit, first a progressive wave is formed on stator 2 in period I. Since the contact areas of rotor 1 and the stator are stressed in the reverse direction of the wave as the wave progresses, rotor 1 rotates continuously. Next, in period II, since a standing wave based on only the B phase of piezoelectric element 30 is formed on stator 2, rotor 1 rests at a prescribed position determined by the position of the nodes and antinodes of the standing wave. In period III, no wave is generated on piezoelectric element 30, and so rotor 1 is maintained in a resting condition. In this manner, the angle of rotation of rotor 1 can be determined by the length of period I. After the rotation of rotor 1 is brought to a rest in period II, the motor goes to a stop condition in which the rotor is retained in a rest position by spring 4 and vibration of piezoelectric element 30 is dissipated. The angle of rotation of rotor 1 is determined by the resting position due to the standing wave in period II. Even when a shift equivalent to less than $\pm \frac{1}{4}$ of a wavelength of the standing wave occurs in the position of rotor 1 at the end point of period I, rotor 1 returns correctly to the same resting position due to the balanced stress. Therefore, it is possible to precisely rotate rotor 1 for the prescribed step angle at each prescribed time without detecting the position of rotor 1 or providing a feedback circuit. Moreover, in period III, the operation of drivers $D_A$ and $D_B$ stops, thus reducing the amount of power required. Such a drive method is highly suited to ultrasonic motors for clocks and watches.

As shown in FIG. 8, the strength of the wave generated on piezoelectric element 30 is detected based on the voltage constantly generated at pilot electrode $7_a$ and the detection output is supplied to feedback control circuit 41. In circuit 41, the actual wave strength detected at the time maximum strength should be obtained is compared with the actual maximum strength generated in the piezoelectric element, and the oscillation frequency of the oscillation circuit OS1 is feedback controlled so that the actual maximum strength obtained becomes the maximum strength set in advance. Therefore, by means of the drive circuit of this example, the ultrasonic motor is always driven with high efficiency.

In this example, non-contact areas $1b$ of rotor 1 were formed in six locations and the step angle was 60 degrees. The step angle can be made smaller by increasing the frequency of the standing wave formed on piezoelectric element 30 and increasing the number of non-contact areas of rotor 1 accordingly.

Figure 10:
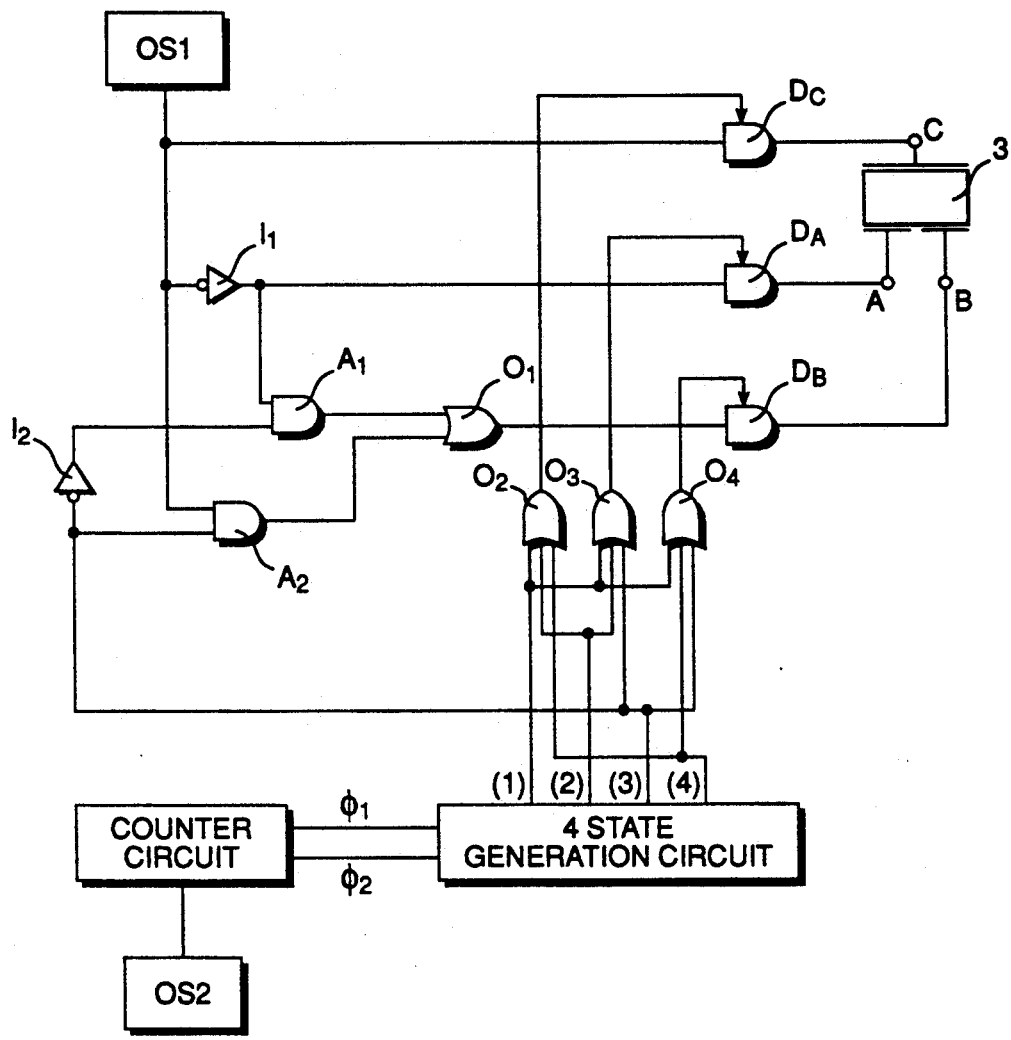
FIG. 10 is a schematic depicting a drive circuit of an alternative embodiment of the invention.

According to a second exemplary embodiment of the present invention, rotor 1, stator 2 and piezoelectric element 3 are the same as in the first embodiment and the same elements are designated by identical reference numbers. FIG. 10 depicts a drive circuit of an ultrasonic motor according to this second embodiment. The control signal output from oscillation circuit OS1 is input to driver $D_C$ which then outputs a drive signal to common terminal C of piezoelectric element 3. This control signal is converted to an inverted signal by inverter $I_1$ and then input to driver $D_A$ which then outputs a drive signal to terminal A. A selector circuit comprising AND circuits $A_1$ and $A_2$, OR circuit $O_1$ and inverter $I_2$ is configured to selectively input the control signal and inverted signal to driver $D_B$ which outputs a drive signal to terminal B. The reference signal is output from oscillation circuit $OS_2$ and passes through a counter circuit and a 4-state generator circuit, whereby 1-s pulse signals are sequentially output and converted to state signals (1), (2), (3) and (4) so they become one 4-s sequence. In addition to entering the selector circuit, these state signals control drivers $D_C$, $D_A$ and $D_B$ via OR circuits $O_2$, $O_3$ and $O_4$. Drivers $D_C$, $D_A$ and $D_B$ each become 3-state drivers which output both high and low levels and are cut off and go to a high output impedance state based on the above state signals.

Figure 11A:
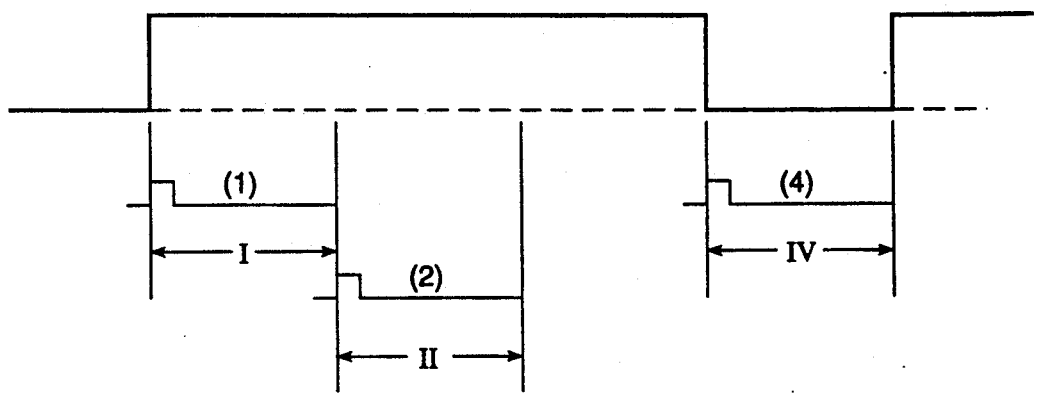
FIGS. 11(a) to (c) are timing charts depicting operation of the drive circuit of FIG. 10.
Figure 11B:
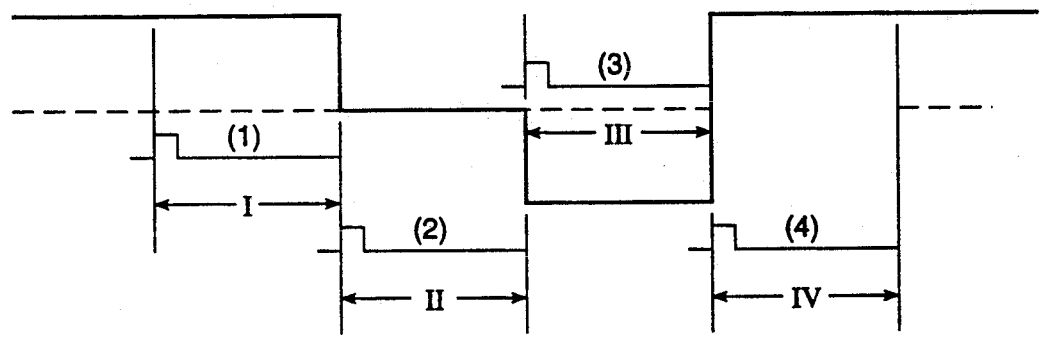
Figure 11C:
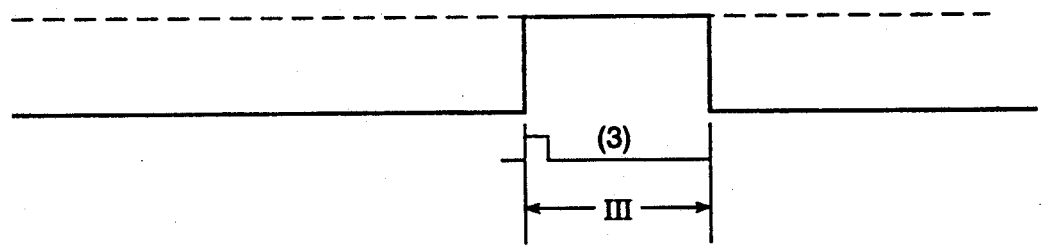

FIG. 11 (a) shows the output states of driver $D_A$ which supplies a drive signal to terminal A when state signals (1), (2) and (3) are output and goes to a high output impedance state in period IV. FIG. 11 (b) shows the output states of driver $D_B$, which supplies a drive signal to terminal B when state signals (1), (3) and (4) are output and goes to a high output impedance state in period II. The selector circuit is provided in the stage before driver $D_B$. Since state signal (3) from the 4-state generator circuit is input to the selector circuit, a signal (inverted signal) whose phase is shifted 180 degrees from the drive signal of driver $D_A$ is output to terminal B in period III. FIG. 11 (c) shows the output states of driver $D_C$, which supplies a drive signal (inverted signal) to the common terminal C when state signals (1), (2) and (4) are output and goes to a high output impedance state in period III.

Figure 12:
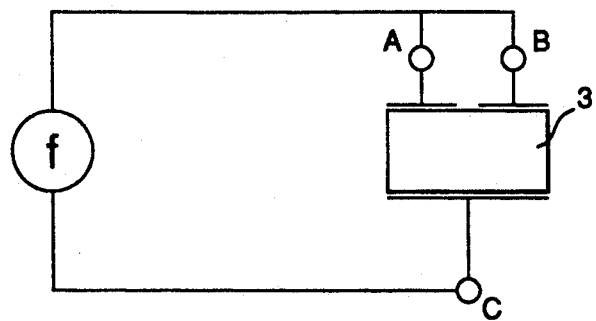
FIGS. 12 (1) to (4) are schematic diagrams depicting connection conditions in the four stages of the drive method of FIG. 10.
Figure 12:
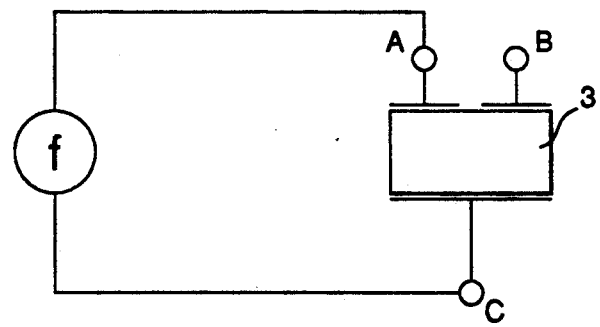
Figure 12:
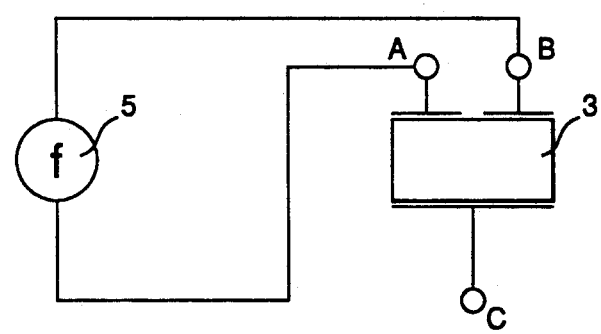
Figure 12:
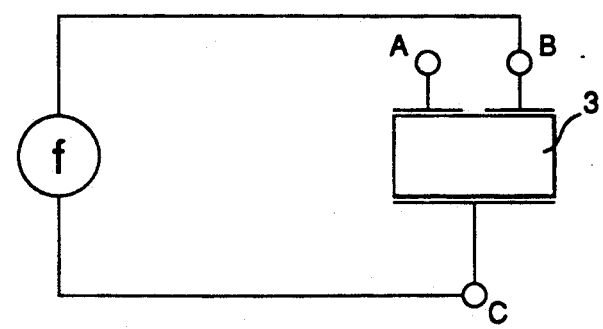

When these state signals are output in sequence from (1) to (4), piezoelectric element 3 is driven by connection conditions such as shown in FIGS. 12 (1) to (4). When state signal (1) is output, an AC voltage based on the drive signal is applied with the same phase to both the A and B phases of piezoelectric element 30 in period I, as seen in FIG. 12 (1). When state signal (2) is output, an AC voltage is applied to only the A phase of piezoelectric element 30 in period II, as seen in FIG. 12 (2). When state signal (3) is output, AC voltages whose phases are mutually shifted 180 degrees are applied to the A and B phases of piezoelectric element 30 in period III since the common electrode C positioned opposite terminals A and B is cut off and goes to a floating potential as shown in FIG. 12 (3). Finally, when state signal (4) is output, an AC voltage is applied on only the B phase of piezoelectric element 30 in period IV.

Figure 13:
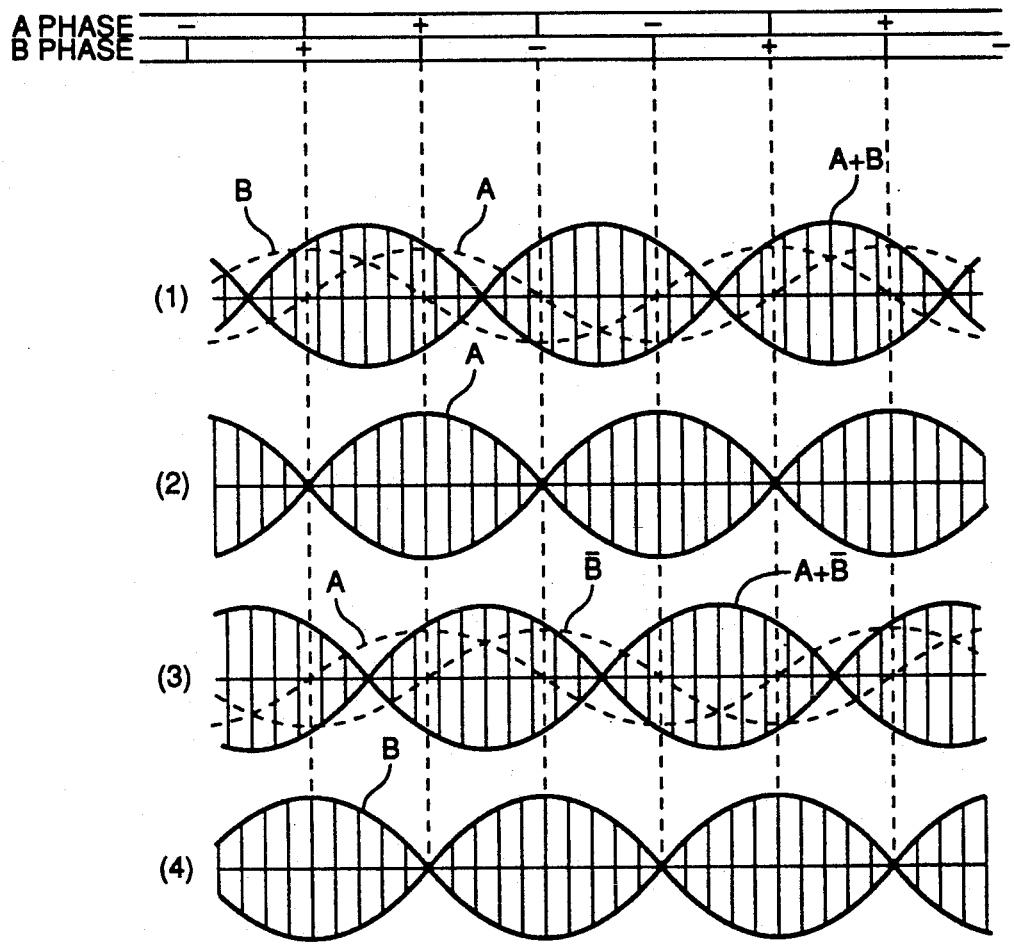
FIG. 13 shows four waveform diagrams depicting the standing waves generated during operation of the drive circuit of FIG. 10.

In this manner, by changing the drive condition in four stages from period I to period IV, the composite standing wave A+B produced by standing wave A based on deformation of the A phase and standing wave B based on deformation of the B phase in the same phase is generated on piezoelectric element 30 in period I, as seen in FIG. 13 (1). In period II, standing wave A based on deformation of only the A phase is generated as shown in FIG. 13 (2). In period III, the composite standing wave A+$\bar{B}$ produced by standing wave A based on deformation of the A phase and standing wave B based on deformation of the B phase, whose phase is shifted 180 degrees, is generated, as seen in FIG. 13 (3). In period IV, standing wave B based on deformation of only the B phase is generated. As a result, all phases of standing waves formed from period I to period IV are different, and the positions of the nodes or antinodes of those standing waves sequentially shift one-eighth of a period at a time. Therefore, stepping operation of rotor 1 is accomplished by repeating sequentially these four stages.

The second embodiment employs only standing waves to perform stepping operation and not any progressive waves as used in the prior art. Therefore, since the position of rotor 1 is dependent on only the phase of the standing wave, there is absolutely no margin for the angle of rotation to become imprecise as in drive by progressive waves. Since the driver connected to the electrode not being used can be set to a high output impedance condition by using 3-state drivers as drivers $D_C$, $D_A$ and $D_B$ of the drive circuit, a composite standing wave as depicted in FIG. 13 (3) can be generated by the connection method illustrated in FIG. 12 (3) and the configuration of the drive circuit can be simplified over the prior art. When a drive signal is not supplied to terminal A or B in order to cause deformation of only the A or B phase, the flow of power from the terminal not being used stops, thereby improving drive efficiency. Since the time to stabilize the vibration condition is shortened when switching conditions, high speed drive is obtainable.

Figure 14A:
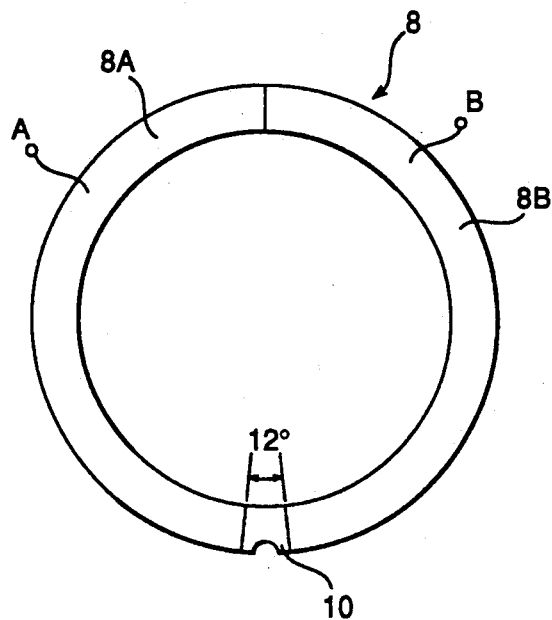
FIGS. 14(a) and (b) are top and side views, respectively, depicting a piezoelectric element of a third embodiment.
Figure 14B:
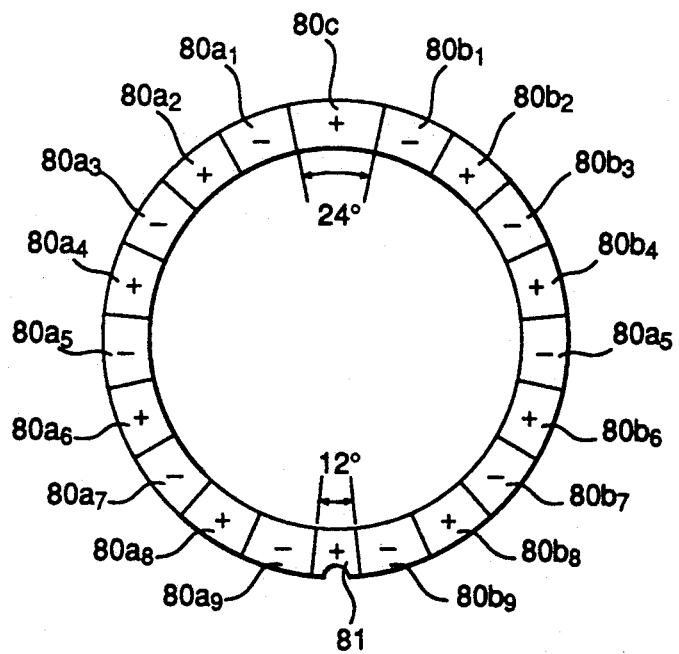

The ultrasonic motor of the third embodiment is employed to directly drive the second hand of a clock or watch. Piezoelectric element 8, shown in FIG. 14(a) replaces piezoelectric element 3 of the first embodiment. FIG. 14(a) depicts the surface not attached to stator 2 of piezoelectric element 8. On the surface are formed A phase electrode 8A, B phase electrode 8B and pilot electrode 10. FIG. 14(b) is a diagram of the under surface of piezoelectric element 8 with each of the sub-element electrodes omitted, where piezoelectric sub-elements $80_{a1}$, $80_{a2}$, ..., $80_{a9}$ are formed as piezoelectric sub-element row A and piezoelectric sub-elements $80_{b1}$, $80_{b2}$, ..., $80_{b9}$ are formed as piezoelectric sub-element row B, and piezoelectric sub-elements polarized in opposite directions are alternated. The A and B phases are established to each form a 10-period standing wave around the circumference of piezoelectric element 8. Each piezoelectric sub-element occupies 18 degrees. Piezoelectric sub-elements $80c$ occupies 24 degrees and piezoelectric sub-element 81 occupies 12 degrees. As a result, the A and B phases are established at positions mutually shifted one-sixth of a phase.

In this embodiment, rotor 1 is used in which non-contact areas 1b are located at twenty equally spaced positions along the outer circumference of rotor 1 so as to agree with the frequency of standing waves generated on stator 2 based on deformation of piezoelectric element 8.

Figure 15:
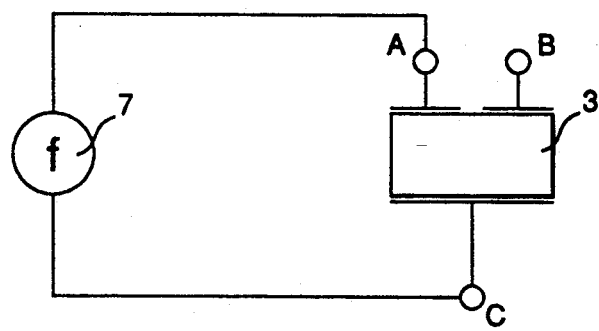
FIGS. 15 (1) to (3) are schematic diagrams depicting the connection conditions in each of the stages in the drive method of the third embodiment.
Figure 15:
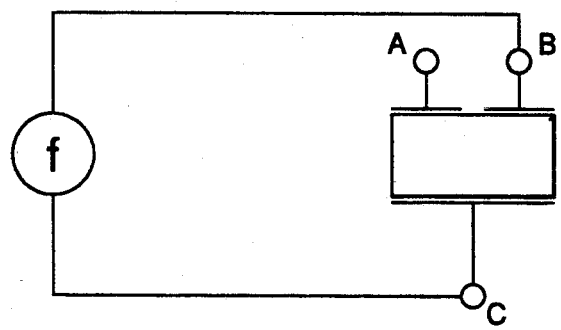
Figure 15:
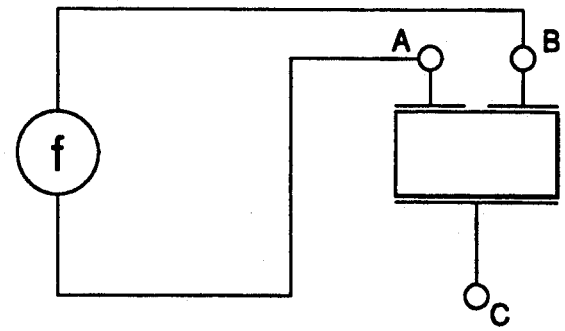
Figure 16:
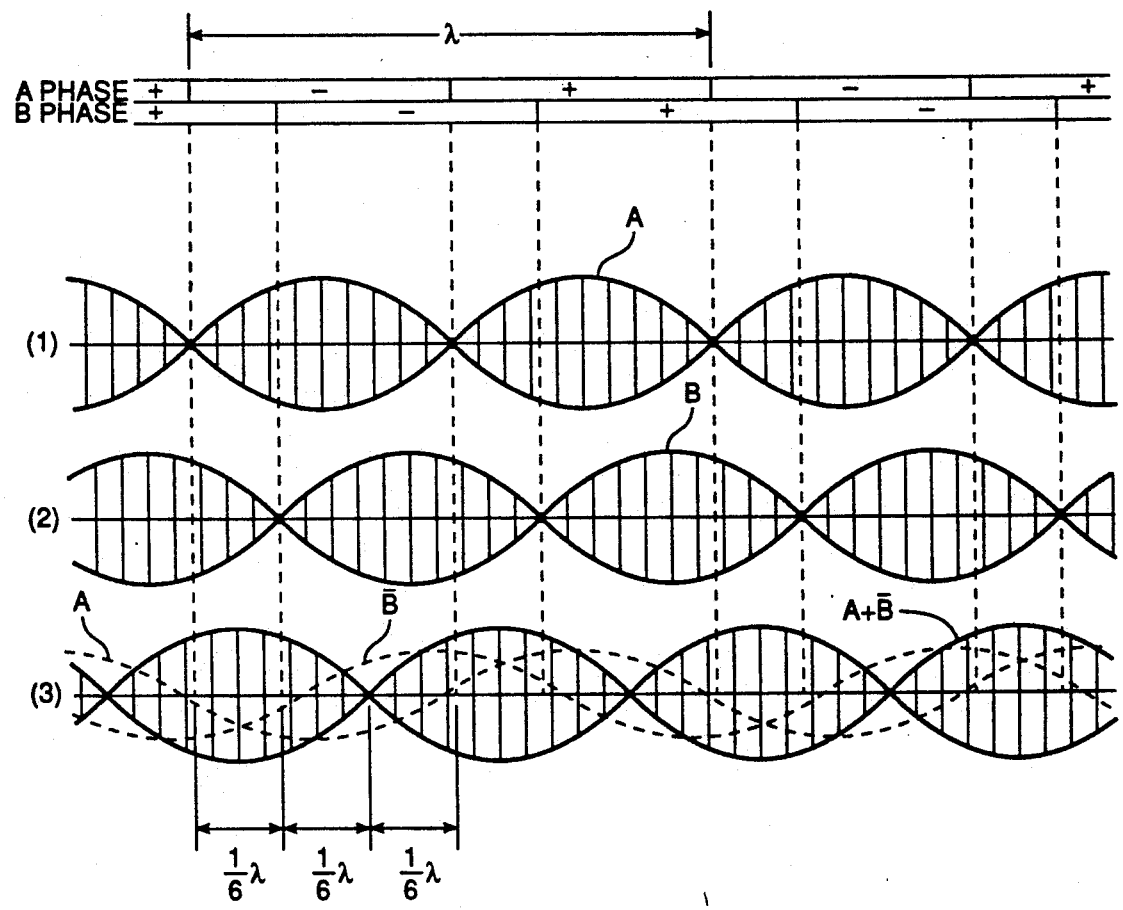
FIG. 16 shows three waveform diagrams depicting the standing waves generated during operation of the third embodiment.

As shown in FIGS. 15 (1) to (3), in the method by which this ultrasonic motor is driven, drive condition (1) which cuts off terminal B and inputs the drive signal between terminal A and common terminal C, drive condition (2) which cuts off terminal A and inputs the drive signal between terminal B and common terminal C, and drive condition (3) which cuts off common terminal C and inputs the drive signal with a phase shifted 180 degrees between terminals A and B are repeated in sequence (or reverse sequence) and rotor 1 is stepped one-sixth of a period each time on stator 2. Here, the drive circuit can be operated by repeatedly outputting three state signals (2) to (4) in the circuit configuration explained in the second embodiment and shown in FIG. 10. In drive condition (1), as shown in FIG. 16 (1), standing wave A is generated based on deformation of only the A phase of the piezoelectric sub-element row, in drive condition (2), as shown in FIG. 16 (2). Standing wave B is generated based on deformation of only the B phase, and in drive condition (3), as shown in FIG. 16 (3), the composite standing wave A+$\bar{B}$ is generated as a composite of standing wave A and standing wave $\bar{B}$ whose phase is shifted 180 degrees from that of standing wave B. By sequentially repeating these drives states (1) to (3), the positions of the nodes or antinodes of the standing wave move one-sixth of the period of the standing wave, thus making it possible to step rotor 1 as in the second embodiment. Since the stepping angle is 6 degrees, the second hand of the clock or watch can be driven directly by the rotation of rotor 1 without having to employ a rotation transfer mechanism.

In both the second and third embodiments explained above, the rotor could be accurately rotated by exactly the amount of the phase difference between standing waves using only standing waves, but by matching the frequency of the drive signal with a particular resonance frequency, the vibration displacement of the piezoelectric element follows an elliptical path, and by matching the horizontal component on the elliptical path with the direction of rotation of rotor 1, the stress in the horizontal direction based on the horizontal component can be used to promote the rotation of rotor 1. The period of the stepping operation can be varied by the interval of the state signals, etc.

Figure 18:
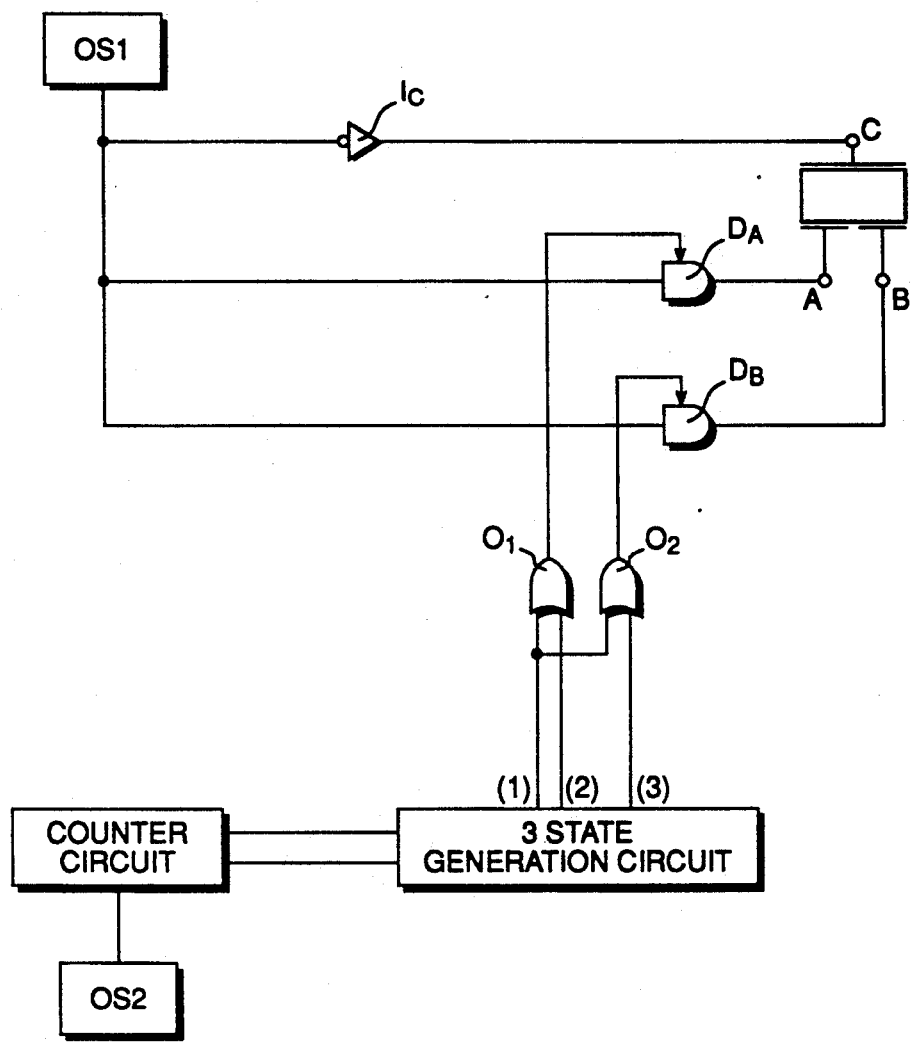
FIG. 18 is a schematic of a drive circuit of the fourth embodiment.

FIG. 18 is a schematic of the drive circuit of a fourth embodiment of an ultrasonic motor according to the present invention. The control signal output from oscillation circuit OS1 becomes an inverted signal in inverter Ic so that a drive signal is output to common terminal C of piezoelectric element 3. This control signal is also input to drivers $D_A$ and $D_B$ so that drive signals are output to terminals A and B. The reference signal is output from oscillation circuit OS2 and passes through the counter circuit and 3-state oscillation circuit, whereby it is converted to state signals (1), (2) and (3) which sequentially output pulses in 1-s intervals to form 3-s sequences. These state signals control drivers $D_A$ and $D_B$ via OR circuits O1 and O2. Drivers $D_A$ and $D_B$ are each three-state drivers which output both high and low levels and also are cut off and go to a high output impedance condition based on the above state signals.

Figure 19A:
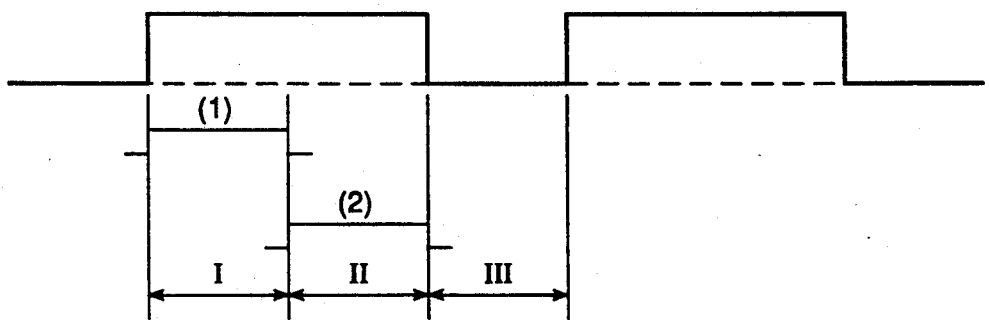
FIGS. 19(a) to (c) are timing charts depicting operation of the drive circuit of the fourth embodiment.
Figure 19B:
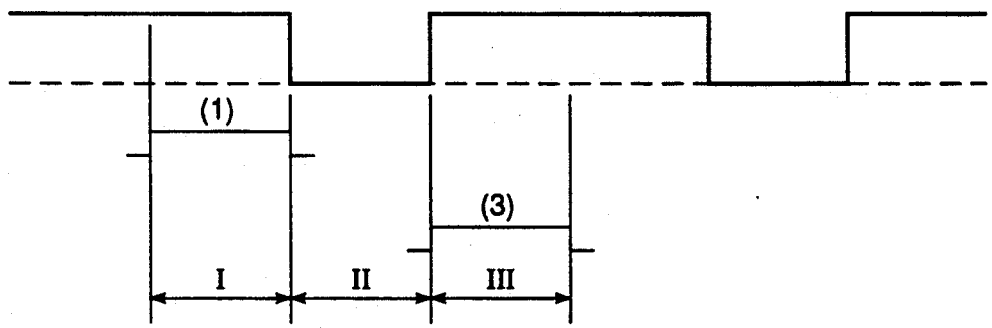
Figure 19C:
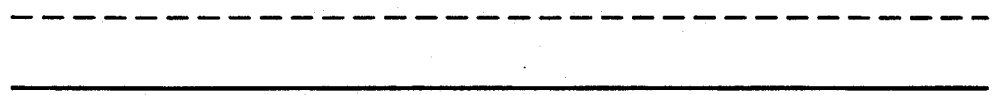

Considering operation of the drive circuit, FIG. 19(a) depicts the output conditions of driver $D_A$. When state signals (1) and (2) are output to driver $D_A$, the driver supplies a drive signal to terminal A. In period III the driver goes to a high output impedance condition. FIG. 19(b) shows the output conditions of driver $D_B$. When state signals (1) and (3) are output to driver $D_B$, the driver supplies a drive signal to terminal B. In period II the driver goes to a high output impedance condition. FIG. 19(c) shows the output conditions of driver $D_C$ which outputs an inverted signal to common terminal C.

Figure 20:
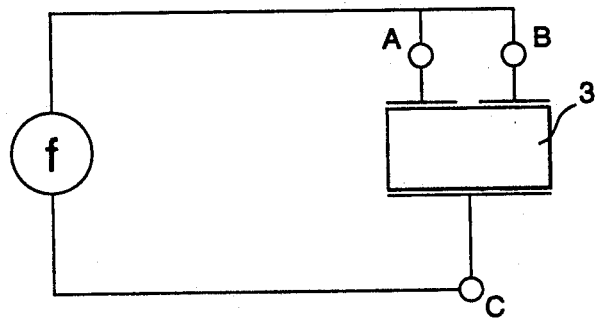
FIGS. 20 (1) to (3) are diagrams depicting connection conditions at each stage of the drive method of the fourth embodiment.
Figure 20:
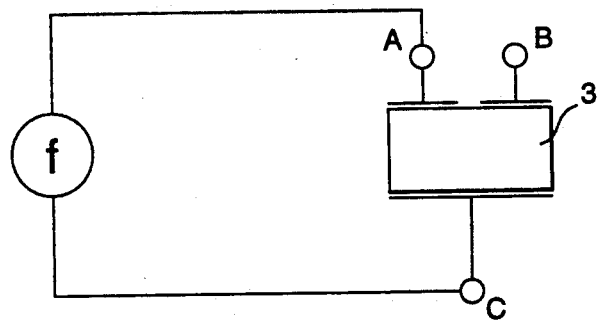
Figure 20:
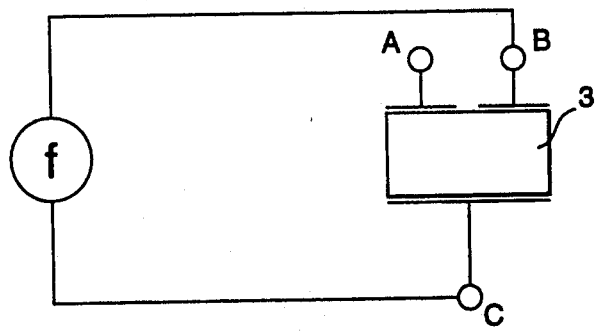

When these state signals are output in sequence from (1) to (3), piezoelectric element 3 is driven by the connection conditions shown in FIGS. 20 (1) to (3). When state signal (1) is output, an AC voltage is applied with the same phase on both the A and B phase of piezoelectric element 30 in period I based on the drive signal as shown in FIG. 20 (1). When state signal (2) is output an AC voltage is applied on only the A phase of piezoelectric element 30 in period II as shown in FIG. 20 (2). When the state signal (3) is output, an AC voltage is applied on only the B phase of piezoelectric element 30 in period III as shown in FIG. 20 (3).

Figure 21:
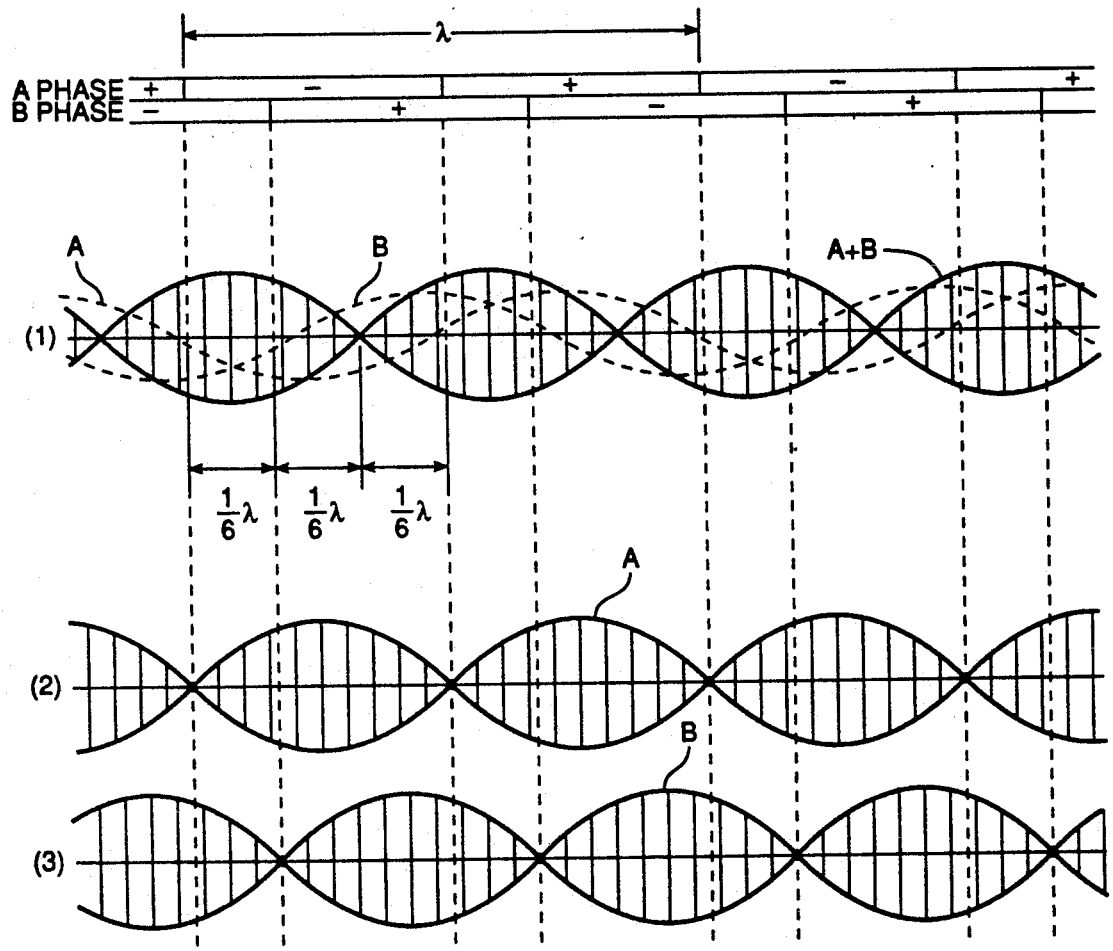
FIG. 21 shows three waveform charts depicting standing waves generated during drive of the fourth embodiment.

By changing the drive condition in three stages from period I to period III in this manner, composite wave A+B made up of the standing wave based on deformation of the A phase and the standing wave based on deformation of the B phase in mutually the same phase is generated on piezoelectric element 30 in period I as shown in FIG. 21 (1). Standing wave A based on deformation of only the A phase is generated in period II as shown in FIG. 21 (2). Standing wave B based on deformation of only the B phase is generated in period III. As a result, the phases of the standing waves formed from period I to period III all differ and the positions of the nodes or the antinodes of those standing waves are each sequentially shifted one-sixth of a phase. Therefore, stepped operation of rotor 1 is accomplished by sequentially repeating these three stages.

This embodiment is distinguished by the fact that the stepping operation is performed using only standing waves, not progressive waves as employed in the prior art. Since the position of rotor 1 is solely dependent on the phases of the standing waves, there is no margin for error in the angle of rotation as in progressive wave drive. Further, by using 3-state drivers as in each of drivers $D_A$ and $D_B$ of the drive circuit, the driver connected to the electrode not being used can be set to a high output impedance state, thus stopping power flowing from the terminal not used when the drive signal is not supplied to either terminal B or A in order to cause deformation of only the A phase or the B phase. Therefore, in addition to improving drive efficiency, high speed drive is achieved because the time to stabilization of the vibration condition when the drive condition is switched can be shortened.

Figure 22:
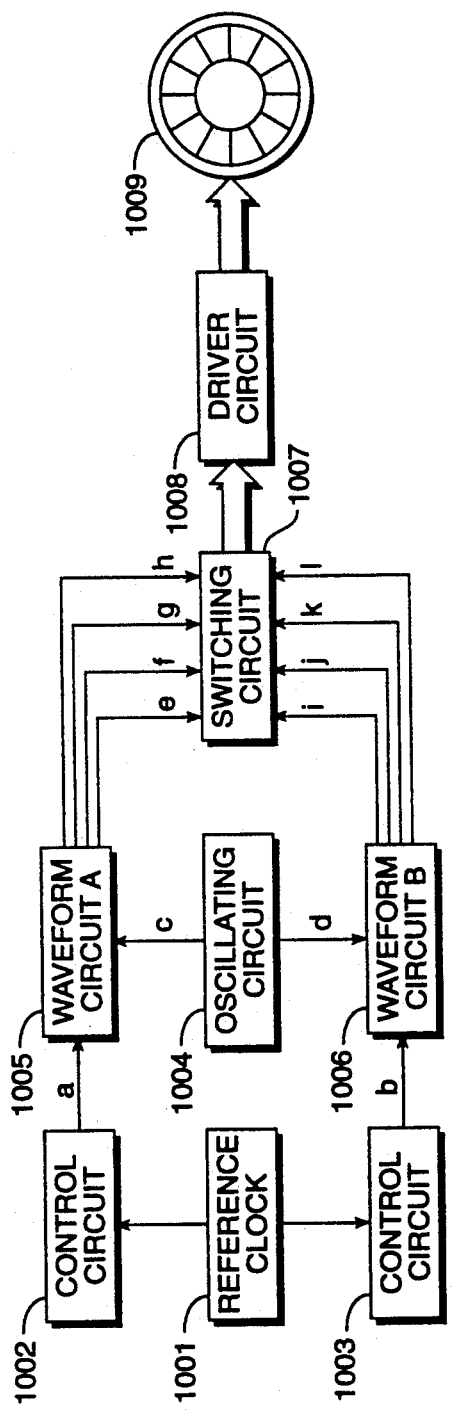
FIG. 22 is a generalized block diagram of the ultrasonic motor and drive system of the fifth embodiment.

FIG. 22 is a generalized block diagram of the ultrasonic motor and drive system of the fifth embodiment of the invention depicting reference clock 1001, control circuit 1002 which controls the continuous drive of the ultrasonic motor, control circuit 1003 which controls step drive, oscillation circuit 1004 provides the signal for oscillating the stator attached to the stator element, waveform formation circuit 1005 provides the drive waveform for continuous drive, and waveform formation circuit 1006 provides the drive waveform for step drive. Switching circuit 1007 sends the output of the waveform formation circuit A, in the case of continuous drive, and the output of the waveform formation circuit B, in the case of step drive, to drive circuit 1008 which vibrates the stator.

Figure 23:
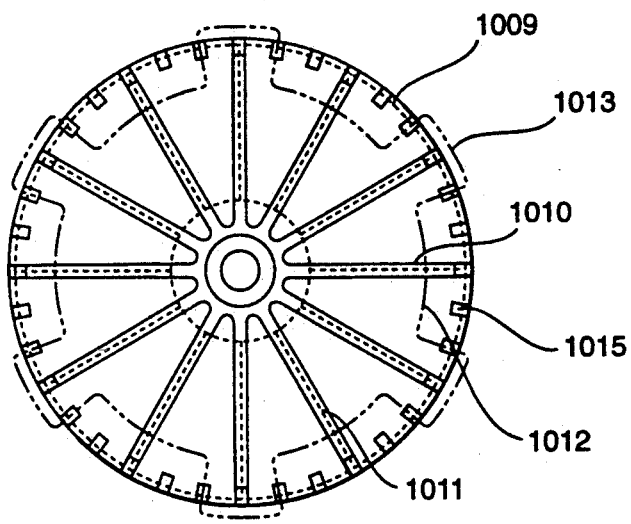
FIG. 23 is a top view of the ultrasonic motor of the fifth embodiment.
Figure 24:
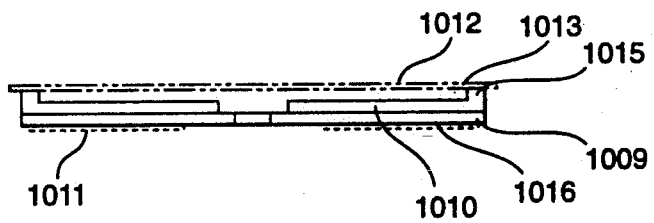
FIG. 24 is a cross section of the ultrasonic motor of the fifth embodiment.

FIG. 23 is a top view showing the configuration of the stator in this embodiment of the invention. FIG. 24 is a cross section of FIG. 23 showing excitation of a 3λ vibration mode. The solid lines indicate the shape of stator 1009, on which twelve ribs 1010 are formed. The wavy lines indicate borderlines 1011 of the piezoelectric element and the electrode pattern divided into 12 units. The borderlines in this embodiment correspond to the positions of the ribs. The two 3λ vibration modes present are configured so that nodes are formed on the ribs. The two-dot chain lines indicate the rotor 1012 on which are formed six notches, i.e. protrusions. The protrusions are in contact with the teeth of stator 1015, receive the driving force and are configured to stop on the vibration nodes.

Figure 25:
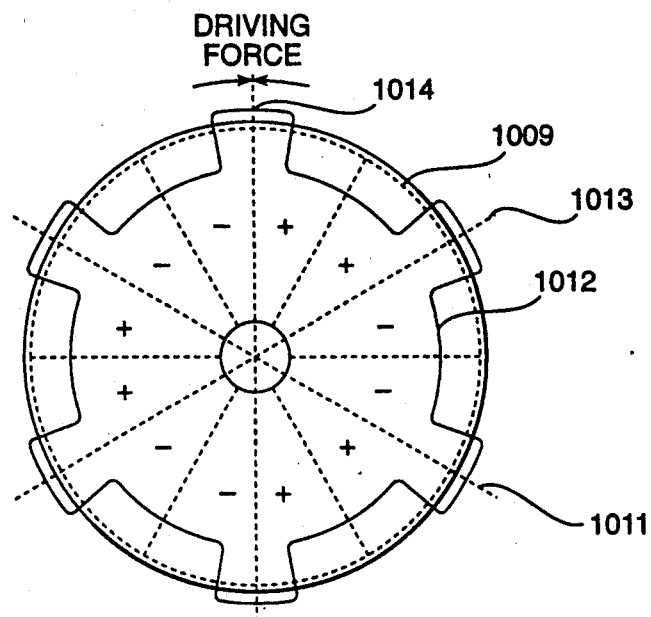
FIG. 25 is a schematic diagram depicting excitation of standing waves in the drive method in the fifth embodiment of the ultrasonic motor.

With regard to the drive method of the ultrasonic motor of this embodiment, the signal output from the reference clock which passes through control circuit B of FIG. 22 is divided in waveform formation circuit B with a built-in inverter into two poles, i.e. a "+" signal which retains the original phase and a "−" signal whose phase is inverted. The oscillation circuit vibrates the stator with a 3λ resonance frequency which it sends to the stator via the switching circuit and the drive circuit. Referring to FIG. 25 depicting the action of the rotor, when a signal with an inverted phase is applied to the stator sub-elements indicated by "−", a standing wave which forms a node at the position indicated by one-dot chain line 1014 is excited and the protrusions on the rotor move to the node and stop.

Figure 26:
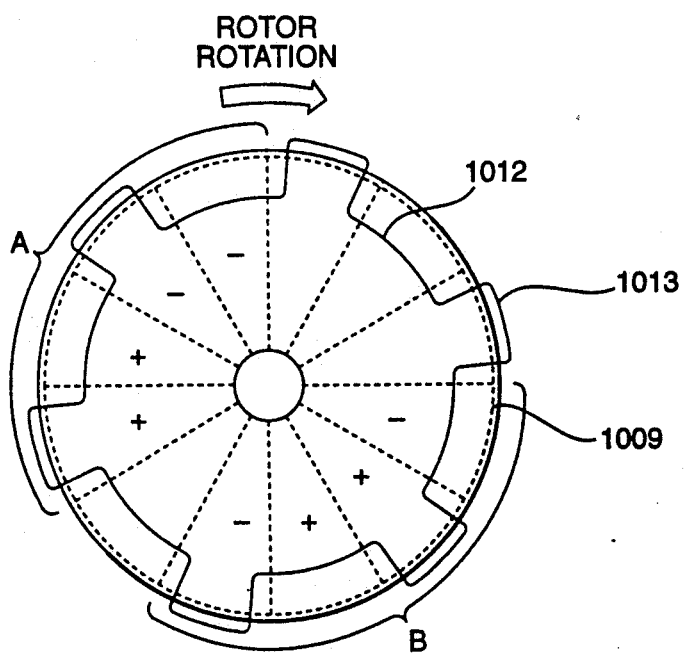
FIG. 26 is a diagram of the drive method depicting excitation of progressive waves in the ultrasonic motor of the fifth embodiment.

Next, the signal output from the reference clock which passes through control circuit A is divided in waveform formation circuit A having a built-in 90-degree phase shifter and inverter into signals whose phases are shifted 90 degrees and which are then each divided into "+" signals which retain the original phase and "−" signals whose phase is inverted for a total of four poles. The oscillation circuit vibrates the stator with a 3λ resonance frequency which is sent to the stator via the switching circuit and the drive circuit. Referring to FIG. 26 depicting action of the rotor, signals having phase shifted 90 degrees are applied on stator sub-elements B or A and signals whose phase are inverted to + or −, respectively, are applied. At that time, a progressive wave is excited on the stator and the rotor moves in the direction of the arrow.

Figure 27:
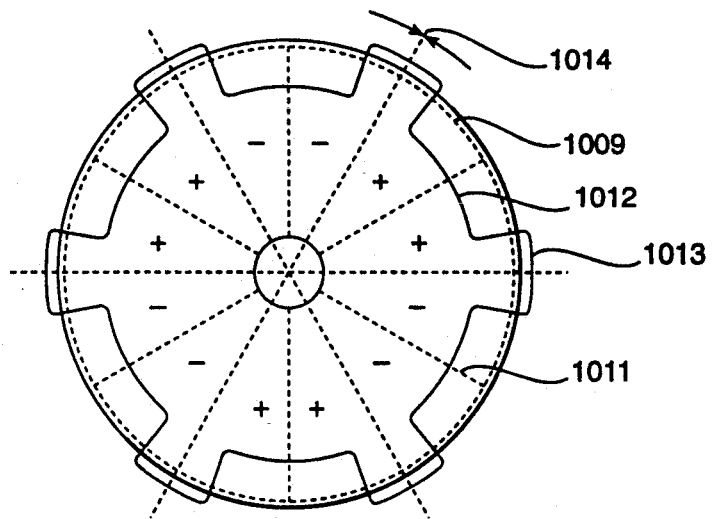
FIG. 27 is a diagram of the drive method depicting the condition following that in FIG. 26 in which standing waves are formed at positions perpendicular to those in FIG. 25.

When sufficient time for rotor rotation has elapsed, e.g. the time required for the moving element to rotate 30 degrees in this embodiment, the signal is stopped by control circuit A and is outputted from control circuit B. Referring to FIG. 27, the signal at this time excites the rotor position shown in FIG. 27 by waveform formation circuit B. A node is formed at position 14 shown in FIG. 27 and rotor protrusions move to and stop at the node position. The signal is stopped by control circuit B for a sufficient time to allow the rotor protrusion to move to the node position. The rotor moves 30 degrees by this series of actions. Step drive in 30-degree increments is performed by repeating this series of actions.

When excitation from standing wave to standing wave is performed without employing progressive waves, the protrusions on the rotor may become positioned over antinodes, rotation may stop, or reverse rotation may occur. Drive employing only progressive waves requires feedback control. By performing this standing wave→progressive wave→standing wave→progressive wave sequence, stepped drive without a rotation detection mechanism is achieved.

The explanation of this embodiment assumed a 3λ mode, however 2λ, 4λ and 5λ modes are possible, at which time drive in 8 divisions, 16 divisions and 20 divisions are obtainable. However, these assume cases in which the two modes present are utilized. If only one mode was utilized in the 3λ, 12-division ultrasonic motor of this embodiment, for example, only 6-division drive is possible in spite of the 3λ mode. Further, when forming the progressive wave, reverse rotation is facilitated by reversing the phase shift or by reversing the shift of the mechanical phase. The rotor then moves 60 degrees by one step. Also, the directions of polarization of the piezoelectric elements are the same in this embodiment, however by reversing the original polarization of the piezoelectric elements, it becomes unnecessary to reverse the signals in the waveform formation circuits A and B.

The structure of the stator in the ultrasonic motor of the fifth embodiment features twelve ribs. The boundaries of the electrode patterns divided into twelve parts correspond to the positions of the ribs, however the positions of the ribs may correspond to the middle of the electrode patterns, and it is not necessary to provide twelve ribs for a 3λ vibration mode, but rather there may be as few as one.

Figure 28A:
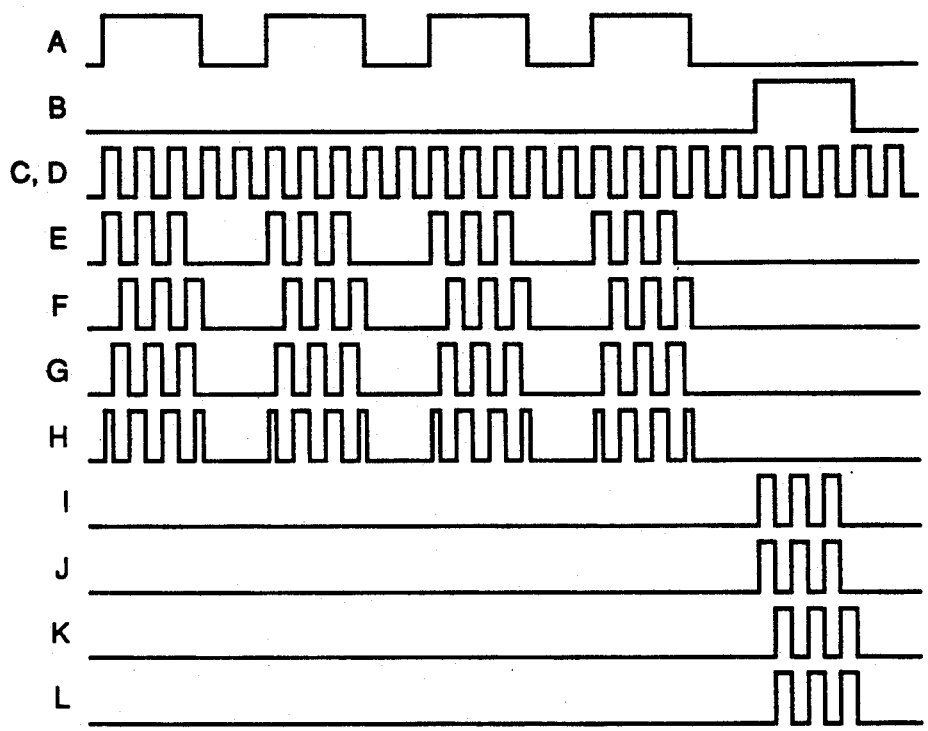
FIGS. 28(a) and (b) is a timing chart for the drive circuit of FIG. 22.
Figure 28B:
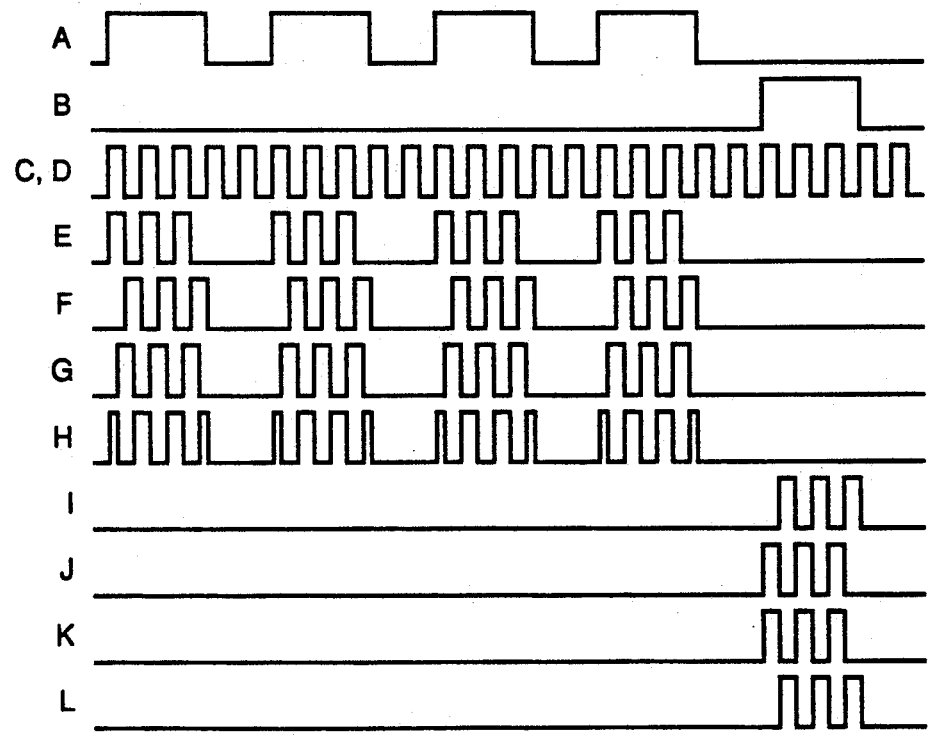
Figure 30:
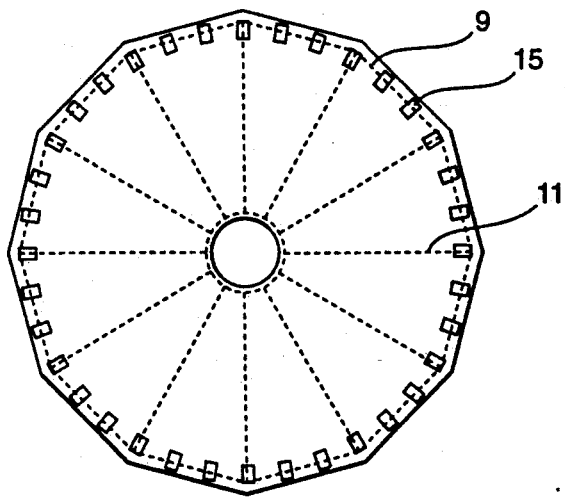
FIG. 30 depicts a stator configuration according to a further alternative method in the fifth embodiment.

FIGS. 28(a) and (b) are timing charts for a case in which the embodiment of the invention is driven by another method and shows conditions for signals A to L. For example, when a 3λ, twelve division vibration mode is excited and a standing wave→progressive wave→standing wave→progressive wave sequence is repeated in this embodiment, 30-degree stepped drive is performed, however a progressive wave is excited and application of the signal is stopped by control circuit A at a position advanced approximately 6 degrees. Next, a progressive wave is excited again, and at a position advanced approximately 6 degrees, application of the signal is stopped by control circuit A, which drive is repeated. Stepped drive with a feed angle of 6 degrees is offered at this time, since excitation of only a progressive wave would result in accumulated error in rotor rotation. Therefore, by exciting a standing wave, for example, once every four times a progressive wave is repeated, control every 30 degrees is obtained thus realizing controllable stepped drive with 60 divisions per rotor rotation.

In another example, a method may be employed which drives continuously with progressive waves and excites standing waves only as required. For example, fast-forwarding or frame advance in a VCR can be simplified.

Figure 29:
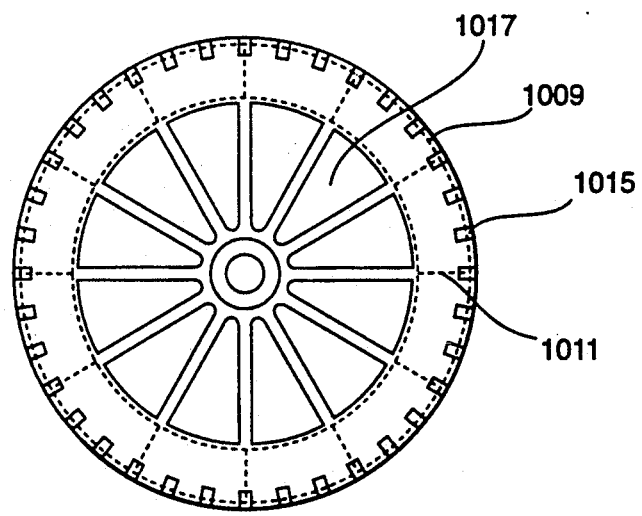
FIG. 29 depicts a stator configuration according to an alternative method in the fifth embodiment.

In the fifth embodiment ribs are employed in the structure to vary rigidity or density at the boundaries between stator sub-elements and other parts, however slits or holes can also be used as shown in FIG. 29. The shape of the circumference can be changed, e.g. a twelve-sided shape for 3λ-mode vibration. Other means can be used to vary rigidity or mass at the boundaries or middle of stator sub-elements from that of other parts with the objective of forming vibration nodes at the boundaries of the sub-elements of the stator.

Excitation of progressive waves is not limited to the method of the fifth embodiment as depicted in FIG. 26. For example, a progressive wave can be excited even if standing wave excitation of FIG. 25 or FIG. 27 is performed, by oscillating from the oscillation circuit a frequency between the resonance frequency vibrated on the stator sub-elements indicated by A and the resonance frequency vibrated on the stator sub-elements indicated by B in FIG. 26. Further, the method of excitation of the standing waves is not limited to that of the fifth embodiment.

Figure 31:
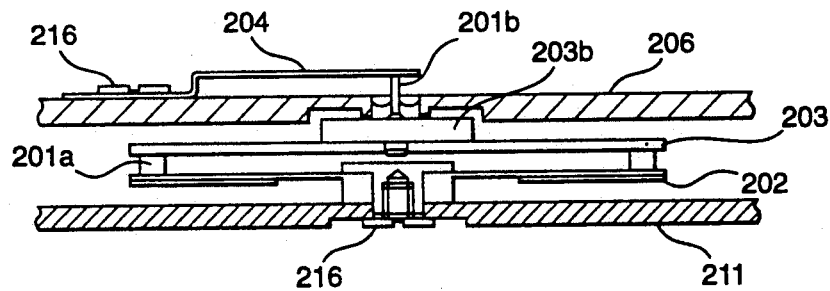
FIG. 31 is a cross section of a sixth exemplary embodiment of an ultrasonic motor of the present invention.
Figure 32:
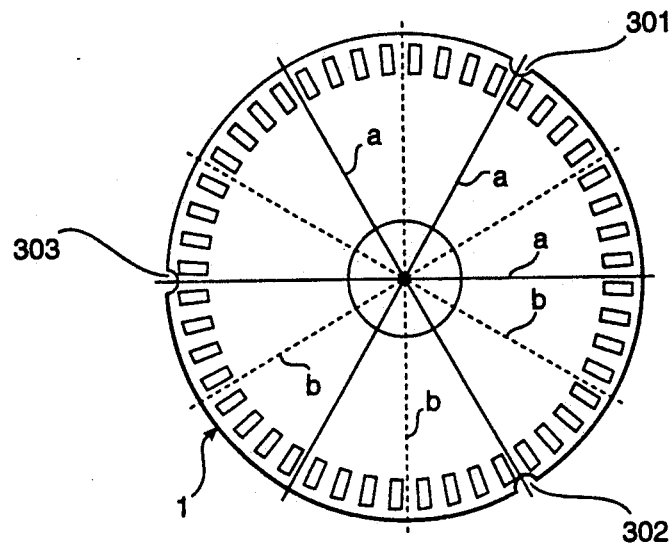
FIG. 32 is a top view of a stator for the ultrasonic motor of FIG. 31.

FIG. 31 is a cross section of a sixth exemplary embodiment of the present invention and FIG. 32 is a top view of the stator of the embodiment of FIG. 31 depicting piezoelectric element 202 attached to stator 1. Stator 1 is fixed to frame 211 by anchor screw 216, and rotor 203 in contact with teeth 201a on stator 1 is supported by support plate 206 via rotation axis 201a on pinion 203b for extracting rotational force to the outside. Since rotation axis 201d is being pushed down by spring 204 fixed with screw 216 to support plate 206, there is frictional contact between rotor 203 and teeth 201a. In FIG. 32, node positions a of the 3λ flexural vibration mode are indicated by the solid lines, and node positions b which intersect at right angles are indicated by the two-dot chain lines. Notches 301, 302 and 303 are provided to adjust the resonance frequencies at respective node positions a and b. In this case, the resonance frequency at node position b is low, so part of the position of the vibration antinode, i.e. node position a, is removed to raise the resonance frequency and match it with the resonance frequency at node position a. The resonance frequency of the vibration mode at node position a at this time is hardly affected since it is part of the node that is removed. The amount removed and the location are not restricted and depend on the amount of resonance frequency correction. Though a part corresponding to one node position is desirable, the configuration is not necessarily so limited as long as the resonance frequencies of two node positions are equal. Laser machining, mechanical machining or other related techniques can be applied as the removal method.

Since the two modes degenerate in the same shape when the resonance frequencies at two node positions intersecting at right angles are matched by means of the above method, the nodes can be freely formed in any direction with axial symmetry. In practice, it is difficult to completely degenerate the two modes in the same shape, however substantially the same effect can be achieved by lowering the Q value of the stator. Specifically, methods such as attaching vibration absorbent material and using material with a large vibration attenuation to construct the stator may be employed.

Figure 33:
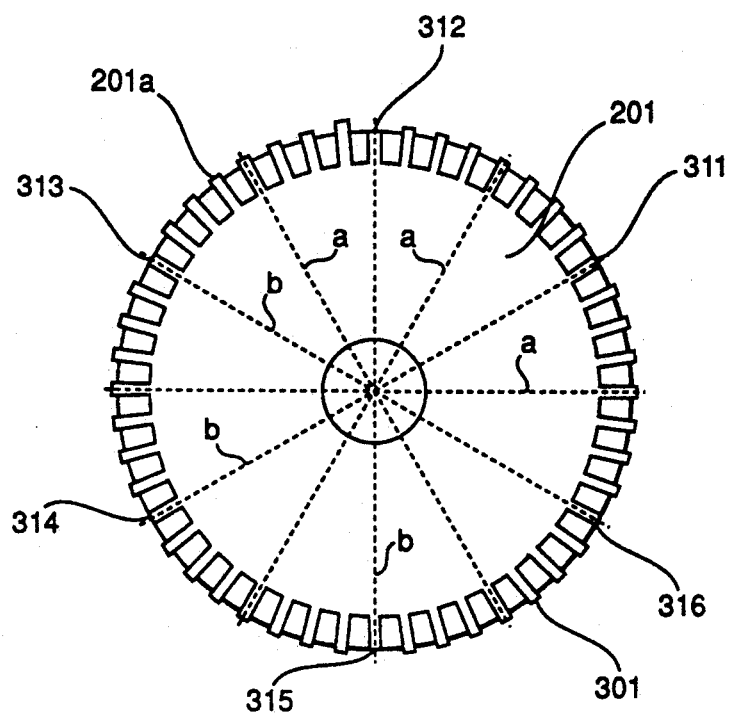
FIG. 33 is a top view depicting a seventh exemplary embodiment of a stator having a plurality of protrusions along the outer circumference.

FIG. 33 is a top view depicting the seventh embodiment of the stator shape in the ultrasonic motor of the present invention on which a plurality of protrusions are provided along the outer circumference. In this case, protrusions 311 to 316 are removed at six locations corresponding to node positions b in order to raise the resonance frequency at node positions a. In this shape it is easy to remove the protrusions and, since the amount of change in resonance frequency can be determined when one protrusion at one location is removed, adjustment is easy.

Figure 34:
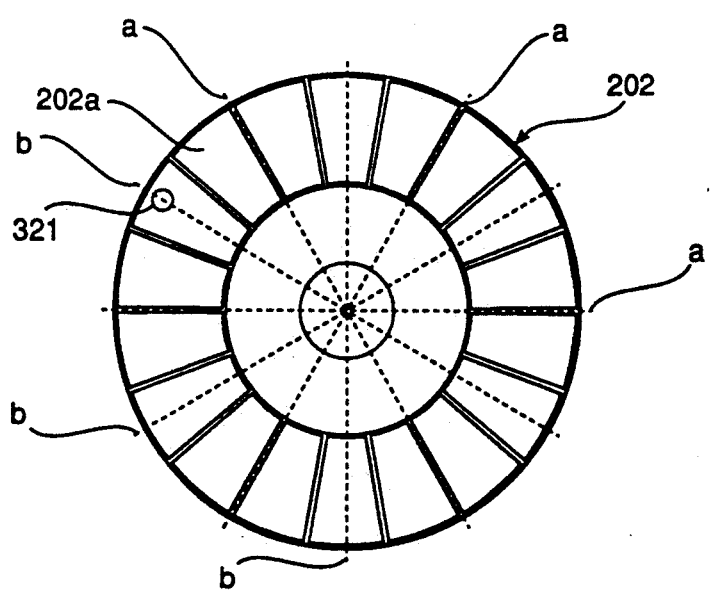
FIG. 34 is a bottom view of an embodiment of a piezoelectric element for use in the ultrasonic motor of the present invention.

FIG. 34 is a bottom view of an embodiment of a piezoelectric element employed in the ultrasonic motor of the present invention. Piezoelectric element 2 is divided into a plurality of stator sub-elements and an electrode pattern 202a is formed on each. By applying an AC voltage on each of the electrode patterns, the stator sub-elements become distorted, thus inducing a standing wave vibration. Mass 321 attached to the electrode pattern is solder or adhesive. By attaching the mass at node position b, the resonance frequency at node position a can be lowered. Since it is easy to attach or remove the mass in such cases, misadjustment is avoided.

Figure 35:
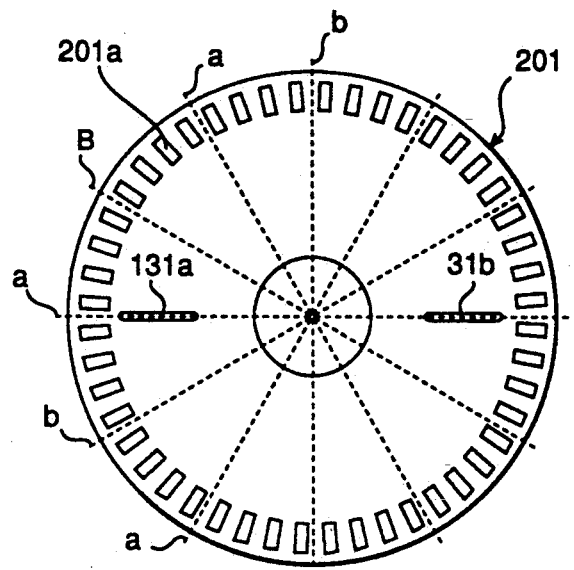
FIG. 35 is a top view of an eighth embodiment of a stator for use in the ultrasonic motor of the present invention.

FIG. 35 is a top view of the eighth embodiment of the stator in the ultrasonic motor of the invention depicting stator 201, teeth 1a, and slits or grooves 131a, 131b at node positions a. Since the rigidity or mass of the stator can be changed, resonance frequencies at node positions a and b can be altered. In this kind of method, the effect on respective node positions a and b can be changed by the shape with substantial freedom.

Figure 36:
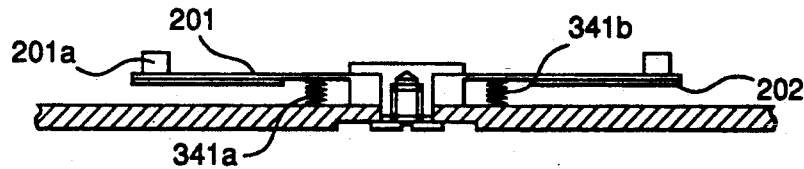
FIG. 36 is a side view of a ninth embodiment of a stator for use in the ultrasonic motor of the present invention.

FIG. 36 is a side view of a ninth embodiment of a stator in the ultrasonic motor of the present invention depicting piezoelectric element 202, teeth 201a, and elastic material 341a, 341b attached to the stator. The parts in contact can raise the resonance frequencies at node positions which become vibration antinodes. In this method attachment and removal are simplified and adjustment can be easily performed.

Figure 37:
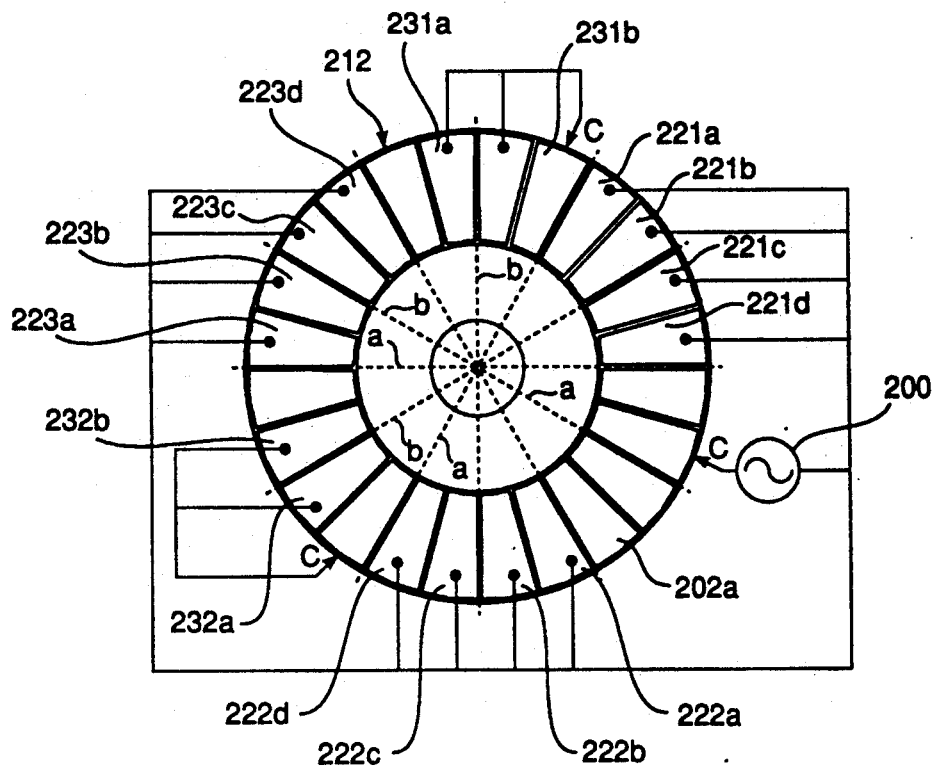
FIG. 37 is a diagram depicting a method for applying voltages to a piezoelectric element in an ultrasonic motor according to the present invention.

FIG. 37 is a diagram depicting a first example of a method for applying voltages to the piezoelectric element in the ultrasonic motor of the present invention. The entire rear surface is a common electrode and piezoelectric element 212 is divided into a plurality of electrode patterns, of which every four of twenty-four patterns as shown in the figure, for example, are combined in a single group. By applying an AC voltage between every other group and common electrode C, a 3λ vibration mode can be induced. That is, electrode patterns 221a to 221d, 222a to 222d and 223a to 223d can be simultaneously driven. At this time, the node position is formed at a, and, therefore, piezoelectric element 212 becomes easy to deform since the electric field generated by the distortion when the area around node positions b, e.g. electrode patterns 231a, 231b, 232a and 232b, in the perpendicular direction are made conductive with common electrode C, can move back and forth. Therefore, the apparent rigidity around node position b falls and the resonance frequency at node position a may be lowered. In this case, the type of vibration mode or the method of vibration is not restricted. Since the charge of those parts whose relative rigidity is to be lowered can be continuously discharged gradually or for a certain period by some circuit means, there is no particular restriction on the method employed. Raising the relative rigidity can also be easily achieved by intentionally applying a voltage.

Figure 38:
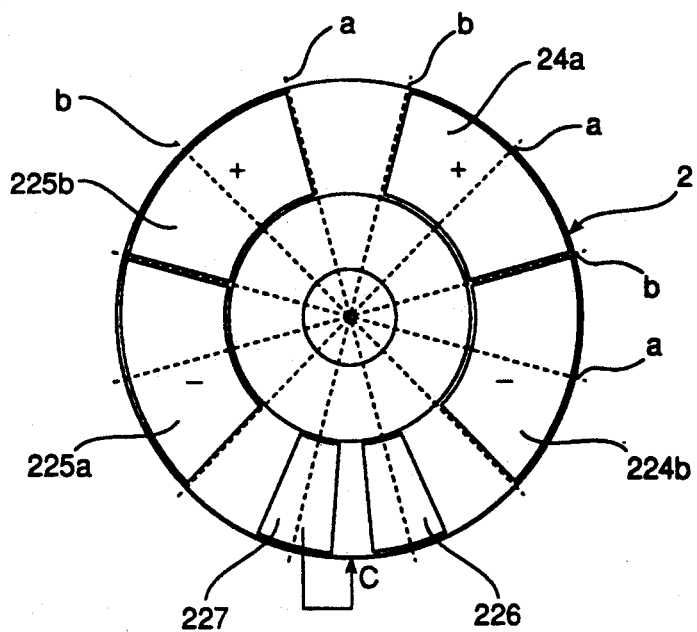
FIG. 38 is a diagram depicting a second exemplary method for applying voltage to a piezoelectric element in the ultrasonic motor of the present invention.

FIG. 38 is a diagram depicting a second example of the method used to apply a voltage to the piezoelectric element in the ultrasonic motor of the present invention wherein piezoelectric element 2 and electrode patterns 224a, 224b, 225a and 225b each having a 60-degree angle are shown. Electrode patterns 24a and 225b are polarized in a positive direction, and electrode patterns 224b and 225a are polarized in a negative direction. Electrode patterns 24a and 225b are separated by 30 degrees, and patterns 24a and 224b are grouped together and patterns 225a and 225b are grouped together. A 3λ progressive wave vibration is formed by applying AC voltages with phases mutually shifted 90 degrees on the two groups. When only the patterns 24a and 224b are driven, node position b is formed. When only the patterns 225a and 225b group are driven, only node position a is driven. When nodes cannot be formed at the desired positions and their respective resonance frequencies differ, thus inhibiting formation of a stable progressive wave, adjusting patterns 226, 227 are provided. Adjustment pattern 227, for example, is conductive with common electrode C on the rear side to reduce apparent rigidity and lower the resonance frequency in the direction of node position a. By means of this adjustment, node positions a and b can be degenerated in the same shape and nodes formed in the desired directions to form a stable progressive wave. The mode of the progressive wave, the method of excitation, the shape and position of the electrode patterns and the method by which the charge is conducted are not restricted.

According to the present invention, vibration modes intersecting at right angles are degenerated in the same shape by increasing or lowering the mass or rigidity and conducting the charge. The objective is to adjust the resonance frequency until degeneration is complete.

As described above, the invention provides an ultrasonic motor with non-contact areas on a rotor which correspond to the periods in which the piezoelectric sub-element rows are formed, a plurality of level differences on the surface of the stator with rotational symmetry in the prescribed periods and resting of the rotor at a prescribed position on the stator by standing waves generated on the stator.

Standing waves generated on the stator exert stress on the non-contact areas of the rotor, whereby the rotor rests at a prescribed relative position where the stress becomes balanced. Therefore stepping operation of the rotor is achieved by moving the standing waves. A position sensor or feedback circuit for detecting the rotational position of the rotor and controlling the amount of rotation as in the prior art becomes unnecessary, thus providing an ultrasonic motor which is compact and reduces power consumption.

When a stepping operation accompanying movement of the standing waves is performed where a plurality of level differences with rotational symmetry in the prescribed period are provided on the stator, then the position where the stress becomes balanced always occurs at the same interval, thus facilitating precise stepping operation.

When the first piezoelectric sub-element row and the second piezoelectric sub-element row are formed on the piezoelectric element so that positioning of the piezoelectric sub-elements and their direction of polarization are linearly symmetrical with each other, the strength of vibration at the prescribed drive frequency and the resonance frequency can be made identical, thereby improving drive efficiency.

When three-state drivers with a high output impedance condition are used in the drive means as switches which output the drive signals for each of the electrodes of the piezoelectric elements, then drive efficiency can be improved by cutting off the output switch that is not applying a drive signal in each of the drive conditions to stop the outflow of power from the piezoelectric element. Also the stabilization time of the vibration of the piezoelectric element may be shortened. Further, a fourth standing wave can be generated on the stator by setting the third output switch connected to the common electrode to a high output impedance condition and applying an AC voltage between the first electrode and the second electrode.

Stepping operation can be performed at a desired angle of rotation and power consumption can be reduced by using a drive method for the ultrasonic motor in which the rotor is driven by a progressive wave and is rested by a standing wave and a stop period is provided for the drive condition.

Since the rotor can be driven using only standing waves by sequentially generating a plurality of standing waves with differing phases on the stator, the accuracy of the stepping angle can be improved in the stepping operation of the rotor.

While the invention has been described in conjunction with several specific embodiments, it is evident to those skilled in the art that many further alternatives, modifications and variations will be apparent in light of the forgoing description. Thus, the invention described herein is intended to embrace all such alternatives, modifications, applications and variations as may fall within the spirit and scope of the appended claims.

What is claimed is:

1. An ultrasonic motor comprising:
   an annular piezoelectric element having a circumference and a plurality of sub-elements alternately polarized in opposing directions;
   a stator having a surface with a plurality of protuberances driven by said piezoelectric element to vibrate;
   a rotor in frictional contact with said stator for rotation;
   said piezoelectric element having a circumference and a first piezoelectric sub-element row and a second piezoelectric sub-element row of differing phase and separated by a period defined by an integral portion of said circumference; and
   drive means for applying AC voltages to said first and second piezoelectric sub-element rows;
   said rotor defining a plurality of gaps at intervals that are one-half said period upon a surface facing said stator for cooperation with said protuberances in a direction of rotation.

2. The ultrasonic motor of claim 1 wherein said protuberances of said stator are defined by a plurality of level differences having rotational symmetry formed on said stator along said circumference with a period that is one of 2 n parts (where n is a natural number greater than 2) of said period.

3. The ultrasonic motor of claim 1 wherein said first piezoelectric sub-element row and said second piezoelectric sub-element row are positioned on said piezoelectric element with a spatial phase difference of one-fourth said period.

4. The ultrasonic motor of claim 1 wherein the first piezoelectric sub-element row and the second piezoelectric sub-element row are positioned along the piezoelectric element with a spatial phase difference of one-sixth said period.

5. The ultrasonic motor of claim 1 wherein positioning of said piezoelectric sub-elements and the direction of polarization of said first piezoelectric sub-element row and said second piezoelectric sub-element row are linearly symmetrical on the surface of said piezoelectric element.

6. The ultrasonic motor of claim 1 wherein:
   said piezoelectric element includes a first electrode with conductive contact on one side of said first piezoelectric sub-element row, a second electrode with conductive contact on one side of said second piezoelectric sub-element row and a common electrode with conductive contact on opposite sides of said first and second piezoelectric sub-element rows;
   said drive means being equipped with a first output circuit for outputting drive signals to said first electrode, a second output circuit for outputting drive signals to said second electrode and a third output circuit for outputting drive signals to said common electrode; and
   means for adjusting said output circuits to a high impedance output condition in addition to a drive signal output condition.

7. A method for driving an ultrasonic motor comprising the steps of:
   providing an annular piezoelectric element having a circumference and a plurality of sub-elements alternately polarized in opposing directions;
   providing a stator having a surface with a plurality of protuberances driven by said piezoelectric element to vibrate;
   providing a rotor in frictional contact with said stator for rotation;
   providing said piezoelectric element with a circumference and a first piezoelectric sub-element row and a second piezoelectric sub-element row of differing phase and separated by a period defined by an integral portion of said circumference;
   providing drive means for applying AC voltages to said first and second piezoelectric sub-element rows;
   providing said rotor with a plurality of gaps at intervals that are one-half said period upon a surface facing said stator for cooperation with said protuberances in a direction of rotation;
   providing said piezoelectric element with a first electrode having conductive contact on one side of said first piezoelectric sub-element row, a second electrode having conductive contact on one side of said second piezoelectric sub-element row and a common electrode with conductive contact on opposite sides of said first and second piezoelectric sub-element rows;
   providing said drive means with a first output circuit for outputting drive signals to said first electrode, a second output circuit for outputting drive signals to said second electrode and a third output circuit for outputting drive signals to said common electrode, said output circuits being adjustable to a high impedance output condition in addition to a drive signal output condition; and intermittently rotating said rotor by repeating a first drive condition in which AC voltages with a prescribed mutual phase difference are applied between said first electrode and said common electrode and between said second electrode and said common electrode to induce a progressive wave on said piezoelectric element and a second drive condition in which an AC voltage is applied between said first electrode and said common electrode to induce a standing wave on said piezoelectric element.

8. The method of claim 7 wherein said rotor is intermittently driven by sequentially repeating said first drive condition and said second drive condition and a stop condition in which an AC voltage is not applied between said first electrode and said common electrode.

9. The method of claim 7 wherein said rotor is intermittently driven by sequentially repeating said first drive condition and said second drive condition and a stop condition in which an AC voltage is not applied between said second electrode and said common electrode.

10. A method for driving an ultrasonic motor comprising the steps of:

providing an annular piezoelectric element having a circumference and a plurality of sub-elements alternately polarized in opposing directions;

providing a stator having a surface with a plurality of protuberances driven by said piezoelectric element to vibrate;

providing a rotor in frictional contact with said stator for rotation;

providing said piezoelectric element with a circumference and a first piezoelectric sub-element row and a second piezoelectric sub-element row of differing phase and separated by a period defined by an integral portion of said circumference;

providing drive means for applying AC voltages to said first and second piezoelectric sub-element rows;

providing said rotor with a plurality of gaps at intervals that are one-half said period upon a surface facing said stator for cooperation with said protuberances in a direction of rotation;

providing said piezoelectric element with a first electrode having conductive contact on one side of said first piezoelectric sub-element row, a second electrode having conductive contact on one side of said second piezoelectric sub-element row and a common electrode with conductive contact on opposite sides of said first and second piezoelectric sub-element rows;

providing said drive means with a first output circuit for outputting drive signals to said first electrode, a second output circuit for outputting drive signals to said second electrode and a third output circuit for outputting drive signals to said common electrode, said output circuits being adjustable to a high impedance output condition in addition to a drive signal output condition; and intermittently rotating said rotor by repeating a first drive condition in which AC voltages with a prescribed mutual phase difference are applied between said first electrode and said common electrode and between said second electtode and said common electrode to induce a progressive wave on said piezoelectric element and a second drive condition in which an AC voltage is applied between said second electrode and said common electrode to induce a standing wave on said piezoelectric element.

11. The method of claim 10 wherein said rotor is intermittently driven by sequentially repeating said first drive condition and said second drive condition and a stop condition in which an AC voltage is not applied between said first electrode and said common electrode.

12. The method of claim 10 wherein said rotor is intermittently driven by sequentially repeating said first drive condition and said second drive condition and a stop condition in which an AC voltage is not applied between said second electrode and said common electrode.

13. A method for driving an ultrasonic motor comprising the steps of:

providing an annular piezoelectric element having a circumference and a plurality of sub-elements alternately polarized in opposing directions;

providing a stator having a surface with a plurality of protuberances driven by said piezoelectric element to vibrate;

providing a rotor in frictional contact with said stator for rotation;

providing said piezoelectric element with a circumference and a first piezoelectric sub-element row and a second piezoelectric sub-element row of differing phase and separated by a period defined by an integral portion of said circumference;

providing drive means for applying AC voltages to said first and second piezoelectric sub-element rows;

providing said rotor with a plurality of gaps at intervals that are one-half said period upon a surface facing said stator for cooperation with said protuberances in a direction of rotation;

providing said piezoelectric element with a first electrode having conductive contact on one side of said first piezoelectric sub-element row, a second electrode having conductive contact on one side of said second piezoelectric sub-element row and a common electrode with conductive contact on opposite sides of said first and second piezoelectric sub-element rows;

providing said drive means with a first output circuit for outputting drive signals to said first electrode, a second output circuit for outputting drive signals to said second electrode and a third output circuit for outputting drive signals to said common electrode, said output circuits being adjustable to a high impedance output condition in addition to a drive signal output condition; and repeating in any sequence a first drive condition in which an AC voltage is applied between said first electrode and said common electrode to induce a first standing wave on said piezoelectric element, a second drive condition in which an AC voltage is applied between said second electrode and said common electrode to induce a second standing wave on said piezoelectric element, and a third drive condition in which an AC voltage is applied between said first electrode and said common electrode and between said second electrode and said common electrode to induce a third standing wave on said piezoelectric element.

14. A method for driving an ultrasonic motor comprising the steps of:
- providing an annular piezoelectric element having a circumference and a plurality of sub-elements alternately polarized in opposing directions;
- providing a stator having a surface with a plurality of protuberances driven by said piezoelectric element to vibrate; providing a rotor in frictional contact with said stator for rotation; providing said piezoelectric element with a circumference and a first piezoelectric sub-element row and a second piezoelectric sub-element row of differing phase and separated by a period defined by an integral portion of said circumference;
- providing drive means for applying AC voltages to said first and second piezoelectric sub-element rows;
- providing said rotor with a plurality of gaps at intervals that are one-half said period upon a surface facing said stator for cooperation with said protuberances in a direction of rotation;
- providing said piezoelectric element with a first electrode having conductive contact on one side of said first piezoelectric sub-element row, a second electrode having conductive contact on one side of said second piezoelectric sub-element row and a common electrode with conductive contact on opposite sides of said first and second piezoelectric sub-element rows;
- providing said drive means with a first output circuit for outputting drive signals to said first electrode, a second output circuit for outputting drive signals to said second electrode and a third output circuit for outputting drive signals to said common electrode, said output circuits being adjustable to a high impedance output condition in addition to a drive signal output condition; and
- repeating in any sequence a first drive condition in which an AC voltage is applied between said first electrode and said common electrode to induce a first standing wave on said piezoelectric element, a second drive condition in which an AC voltage is applied between said second electrode and said common electrode to induce a second standing wave on said piezoelectric element, a third drive condition in which an AC voltage is applied between said first electrode and said common electrode and between said second electrode and said common electrode to induce a third standing wave on said piezoelectric element, and a fourth drive condition in which an AC voltage is applied between said first electrode and said second electrode with said output switch connected to said common electrode in a cutoff condition to induce a fourth standing wave on said piezoelectric element.

15. A method for driving an ultrasonic motor comprising the steps of:
- providing an annular piezoelectric element having a circumference and a plurality of sub-elements alternately polarized in opposing directions;
- providing a stator having a surface with a plurality of protuberances driven by said piezoelectric element to vibrate;
- providing a rotor in frictional contact with said stator for rotation;
- providing said piezoelectric element with a circumference and a first piezoelectric sub-element row and a second piezoelectric sub-element row of differing phase and separated by a period defined by an integral portion of said circumference;
- providing drive means for applying AC voltages to said first and second piezoelectric sub-element rows;
- providing said rotor with a plurality of gaps at intervals that are one-half said period upon a surface facing said stator for cooperation with said protuberances in a direction of rotation;
- providing said piezoelectric element with a first electrode having conductive contact on one side of said first piezoelectric sub-element row, a second electrode having conductive contact on one side of said second piezoelectric sub-element row and a common electrode with conductive contact on opposite sides of said first and second piezoelectric sub-element rows;
- providing said drive means with a first output circuit for outputting drive signals to said first electrode, a second output circuit for outputting drive signals to said second electrode and a third output circuit for outputting drive signals to said common electrode, said output circuits being adjustable to a high impedance output condition in addition to a drive signal output condition; and
- repeating in any sequence a first drive condition in which an AC voltage is applied between said first electrode and said common electrode to induce a first standing wave on said piezoelectric element, a second drive condition in which an AC voltage is applied between said second electrode and said common electrode to induce a second standing wave on said piezoelectric element, and a third drive condition in which an AC voltage is applied between said first electrode and said second electrode with said common electrode in a cut off condition to induce a third standing wave on said piezoelectric element.

16. A method for driving an ultrasonic motor comprising the steps of:
- providing a rotor;
- providing a stator having protuberances in contact with said rotor;
- providing a piezoelectric element, having a plurality of piezoelectric sub-elements, secured to said stator; and
- switching excitation of a progressive wave, excitation of a standing wave and stoppage of excitation of said stator in time series.

17. An ultrasonic motor comprising:
- a rotor;
- a stator having protuberances in contact with said rotor;
- a piezoelectric element, having a plurality of piezoelectric sub-elements, secured to said stator; and
- means for switching excitation of a progressive wave, excitation of a standing wave and stoppage of excitation of said stator in time series.

18. The motor of claim 17 further comprising a difference in rigidity at a boundary between said stator sub-elements.

19. The motor of claim 17 further comprising a difference in mass at a boundary between said stator sub-elements.

20. The motor of claim 17 further comprising a difference in the rigidity between middle portions of adjacent stator sub-elements.

21. The motor of claim 17 further comprising a difference in the mass between middle portions of adjacent stator sub-elements.

* * * * *